US012701096B2

(12) United States Patent
Chen

(10) Patent No.: US 12,701,096 B2
(45) Date of Patent: Aug. 4, 2026

(54) CONTENT GENERATION METHOD AND APPARATUS, AND COMPUTER DEVICE AND STORAGE MEDIUM

(71) Applicant: TENCENT TECHNOLOGY (SHENZHEN) COMPANY LIMITED, Shenzhen (CN)

(72) Inventor: Xiaoshuai Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 14 days.

(21) Appl. No.: 18/792,717

(22) Filed: Aug. 2, 2024

(65) Prior Publication Data

US 2024/0396856 A1 Nov. 28, 2024

Related U.S. Application Data

(63) Continuation of application No. PCT/CN2023/088594, filed on Apr. 17, 2023.

(30) Foreign Application Priority Data

Nov. 15, 2022 (CN) .......................... 202211423649.5

(51) Int. Cl.
*G06F 15/16* (2006.01)
*G06F 16/58* (2019.01)
(Continued)

(52) U.S. Cl.
CPC .............. *H04L 51/10* (2013.01); *G06F 16/58* (2019.01); *G06V 10/40* (2022.01); *G06V 10/80* (2022.01)

(58) Field of Classification Search
CPC ....... H04L 51/10; G06F 16/58; G06F 16/587; G06V 10/40; G06V 10/80; G06V 10/806
(Continued)

(56) References Cited

U.S. PATENT DOCUMENTS 10,296,540 B1 * 5/2019 Bhole ................. G06F 16/9535
2016/0080298 A1 * 3/2016 Oh ........................ H04L 51/063
709/206
(Continued)

FOREIGN PATENT DOCUMENTS

| CN | 106796583 A | 5/2017 |
| CN | 108701125 A | 10/2018 |
| CN | 114373028 A | 4/2022 |

OTHER PUBLICATIONS

Yifu Chen et al., "MemeFaceGenerator: Adversarial synthesis of Chinese meme-face from natural sentences", arXiv preprint, 2019, 6 pages.
(Continued)

*Primary Examiner* — Kaylee J Huang
(74) *Attorney, Agent, or Firm* — Sughrue Mion, PLLC

(57) ABSTRACT

A content generation method includes: obtaining target interaction text of a target object for a target media object; predicting a target emoji type matching the target interaction text according to the target interaction text and pieces of historical interaction content of the target object that include emoji images; obtaining a target text feature based on feature extraction of the target interaction text; obtaining a reference image feature based on feature extraction of at least one reference emoji image, wherein an emoji type of the at least one reference emoji image is the target emoji type; obtaining an encoding result by performing encoding based on the target text feature and the reference image feature; decoding the encoding result, to generate a target emoji image matching the target interaction text configured for insertion into the target interaction text to generate target interaction content of the target object for the target media object.

16 Claims, 17 Drawing Sheets

(51) Int. Cl.
*G06V 10/40* (2022.01)
*G06V 10/80* (2022.01)
*H04L 51/10* (2022.01)

(58) Field of Classification Search
USPC ................................ 709/206, 204, 201, 217
See application file for complete search history.

(56) References Cited

U.S. PATENT DOCUMENTS

| | | | |
|---|---|---|---|
| 2017/0161238 A1* | 6/2017 | Fang ..................... | G06F 3/0237 |
| 2017/0344224 A1* | 11/2017 | Kay ...................... | G06F 3/0482 |
| 2020/0073485 A1 | 3/2020 | Al-Halah et al. | |
| 2021/0141866 A1* | 5/2021 | Chen ....................... | G06F 40/30 |
| 2021/0209356 A1* | 7/2021 | Wang .............. | G06V 30/19173 |
| 2021/0248751 A1* | 8/2021 | Guo ..................... | G06V 10/454 |
| 2021/0342967 A1* | 11/2021 | Popov ................. | H04N 19/467 |
| 2022/0083206 A1* | 3/2022 | Park ................... | G06F 3/04845 |
| 2023/0267586 A1* | 8/2023 | Wang .................. | H04N 5/2628 |
| | | | 382/159 |
| 2023/0388385 A1* | 11/2023 | Fu ........................ | H04L 67/141 |

OTHER PUBLICATIONS

International Search Report in International Application No. PCT/CN2023/088594, dated Jul. 25, 2023.
Written Opinion in International Application No. PCT/CN2023/088594, dated Jul. 25, 2023.

\* cited by examiner

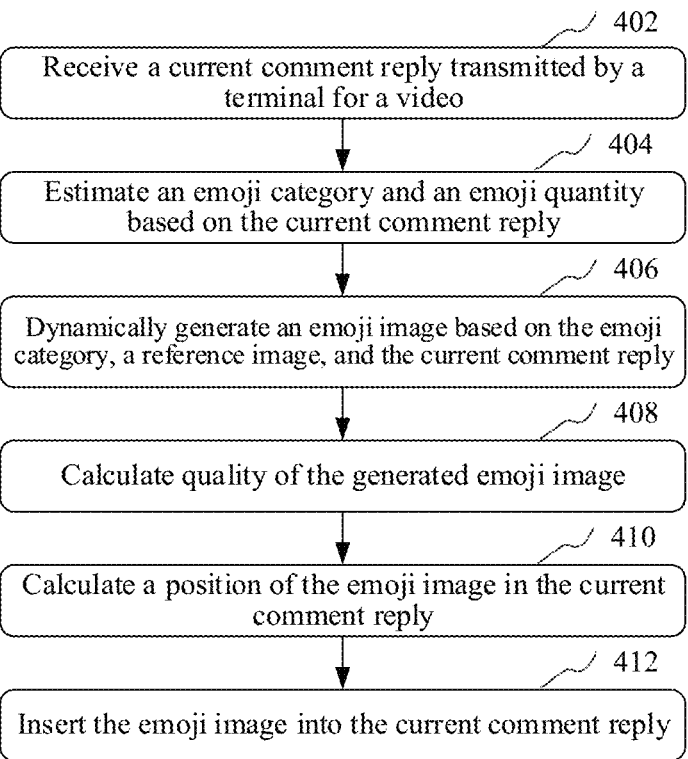

402

Receive a current comment reply transmitted by a terminal for a video

404

Estimate an emoji category and an emoji quantity based on the current comment reply

406

Dynamically generate an emoji image based on the emoji category, a reference image, and the current comment reply

408

Calculate quality of the generated emoji image

410

Calculate a position of the emoji image in the current comment reply

412

Insert the emoji image into the current comment reply

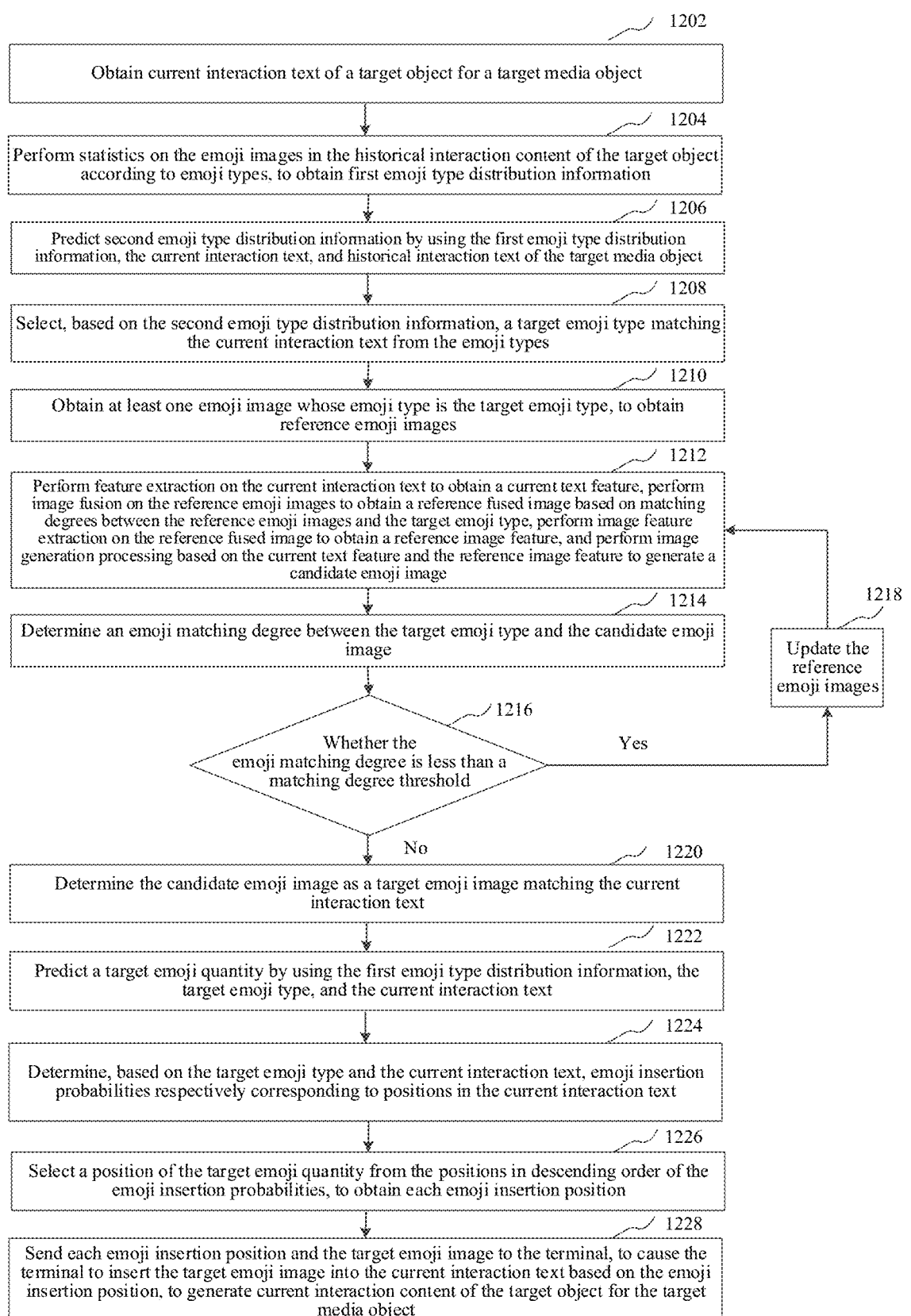

1202

Obtain current interaction text of a target object for a target media object

1204

Perform statistics on the emoji images in the historical interaction content of the target object according to emoji types, to obtain first emoji type distribution information

1206

Predict second emoji type distribution information by using the first emoji type distribution information, the current interaction text, and historical interaction text of the target media object

1208

Select, based on the second emoji type distribution information, a target emoji type matching the current interaction text from the emoji types

1210

Obtain at least one emoji image whose emoji type is the target emoji type, to obtain reference emoji images

1212

Perform feature extraction on the current interaction text to obtain a current text feature, perform image fusion on the reference emoji images to obtain a reference fused image based on matching degrees between the reference emoji images and the target emoji type, perform image feature extraction on the reference fused image to obtain a reference image feature, and perform image generation processing based on the current text feature and the reference image feature to generate a candidate emoji image

1214

Determine an emoji matching degree between the target emoji type and the candidate emoji image

1218

Update the reference emoji images

1216

Whether the emoji matching degree is less than a matching degree threshold

Yes

No

1220

Determine the candidate emoji image as a target emoji image matching the current interaction text

1222

Predict a target emoji quantity by using the first emoji type distribution information, the target emoji type, and the current interaction text

1224

Determine, based on the target emoji type and the current interaction text, emoji insertion probabilities respectively corresponding to positions in the current interaction text

1226

Select a position of the target emoji quantity from the positions in descending order of the emoji insertion probabilities, to obtain each emoji insertion position

1228

Send each emoji insertion position and the target emoji image to the terminal, to cause the terminal to insert the target emoji image into the current interaction text based on the emoji insertion position, to generate current interaction content of the target object for the target media object

CONTENT GENERATION METHOD AND APPARATUS, AND COMPUTER DEVICE AND STORAGE MEDIUM

CROSS-REFERENCE TO RELATED APPLICATIONS

This application is a continuation application of International Application No. PCT/CN2023/088594 filed on Apr. 17, 2023, which claims priority to Chinese Patent Application No. 202211423649.5, filed with the China National Intellectual Property Administration on Nov. 15, 2022, the disclosures of each being incorporated by reference herein in their entireties.

FIELD

This disclosure relates to the field of natural language processing technologies, and in particular, to a content generation method and apparatus, a computer device, and a storage medium.

BACKGROUND

With the development of computer technologies and multimedia technologies, there are increasingly more interactions related to media objects. For example, when viewing a media object on a multimedia platform, an interaction function provided by the media platform may be used to interact with the viewed media object. A comment function may be used to make comments. To increase the richness of interaction content, the interaction content may include an emoji image in addition to text. The media object may include, but is not limited to, a video, a picture, text, or the like.

An emoji image may be manually selected from an existing emoji library, to generate interaction content including the emoji image.

However, the method for manually selecting an emoji image to generate interaction content including the emoji image may take a long time, resulting in low efficiency of content generation.

SUMMARY

Provided are a content generation method and apparatus, a computer device, a computer-readable storage medium, and a computer program product.

According to some embodiments, a content generation method, performed by a computer device, includes: obtaining target interaction text of a target object for a target media object; predicting a target emoji type matching the target interaction text according to the target interaction text and a plurality of pieces of historical interaction content of the target object that include a plurality of emoji images; obtaining a target text feature based on performing feature extraction on the target interaction text; obtaining a reference image feature based on performing feature extraction on at least one reference emoji image, wherein an emoji type of the at least one reference emoji image is the target emoji type; obtaining an encoding result by performing encoding based on the target text feature and the reference image feature; decoding the encoding result, to generate a target emoji image matching the target interaction text configured for insertion into the target interaction text to generate target interaction content of the target object for the target media object.

According to some embodiments, a content generation apparatus, includes: at least one memory configured to store computer program code; and at least one processor configured to read the program code and operate as instructed by the program code, the program code including: text obtaining code configured to cause at least one of the at least one processor to obtain target interaction text of a target object for a target media object; type determining code configured to cause at least one of the at least one processor to predict a target emoji type matching the target interaction text according to the target interaction text and a plurality of pieces of historical interaction content of the target object that include a plurality of emoji images; feature extraction code configured to cause at least one of the at least one processor to obtain a target text feature based on performing feature extraction on the target interaction text; referencing code configured to cause at least one of the at least one processor to obtain a reference image feature based on performing feature extraction on at least one reference emoji image, wherein an emoji type of the at least one reference emoji image is the target emoji type; and image generation code including encoding code and decoding code, wherein the encoding code is configured to cause at least one of the at least one processor to obtain an encoding result by performing encoding based on the target text feature and the reference image feature, and wherein the decoding code is configured to cause at least one of the at least one processor to decode the encoding result, to generate a target emoji image matching the target interaction text configured for insertion into the target interaction text to generate target interaction content of the target object for the target media object.

According to some embodiments, a non-transitory computer-readable storage medium, storing computer code which, when executed by at least one processor, causes the at least one processor to at least: obtain target interaction text of a target object for a target media object; predict a target emoji type matching the target interaction text according to the target interaction text and a plurality of pieces of historical interaction content of the target object that include a plurality of emoji images; obtain a target text feature based on performing feature extraction on the target interaction text; obtain a reference image feature based on performing feature extraction on at least one reference emoji image, wherein an emoji type of the at least one reference emoji image is the target emoji type; obtain an encoding result by performing encoding based on the target text feature and the reference image feature; and decode the encoding result, to generate a target emoji image matching the target interaction text configured for insertion into the target interaction text to generate target interaction content of the target object for the target media object.

BRIEF DESCRIPTION OF THE DRAWINGS

To describe the technical solutions of some embodiments more clearly, the following briefly introduces the accompanying drawings required for describing the embodiments. Apparently, the accompanying drawings in the following description show only some embodiments of this application, and a person of ordinary skill in the art may still derive other accompanying drawings from these accompanying drawings without creative efforts. In addition, one of ordinary skill would understand that aspects of some embodiments may be combined together or implemented alone.

FIG. 4 is a flowchart of generating a comment reply in some embodiments.

FIG. 12 is a schematic flowchart of a content generation method in some embodiments.

DESCRIPTION OF EMBODIMENTS

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

In the following descriptions, related "some embodiments" describe a subset of all possible embodiments. However, it may be understood that the "some embodiments" may be the same subset or different subsets of all the possible embodiments, and may be combined with each other without conflict. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. For example, the phrase "at least one of A, B, and C" includes within its scope "only A", "only B", "only C", "A and B", "B and C", "A and C" and "all of A, B, and C."

Figure 1:
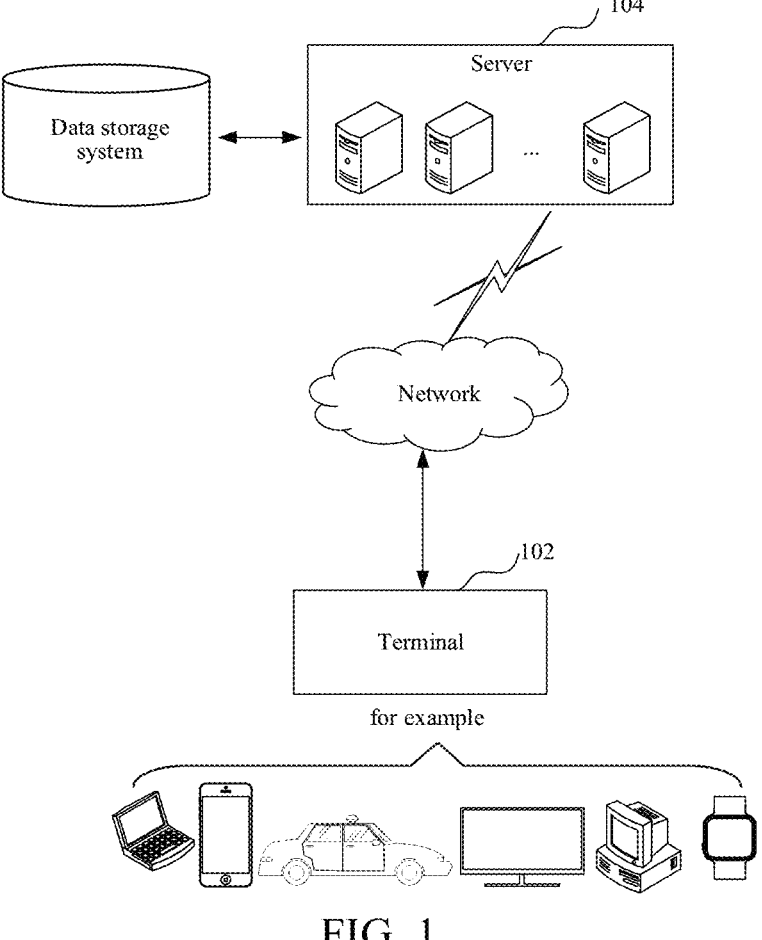
FIG. 1 is a diagram of an application environment of a content generation method in some embodiments.

A content generation method according to some embodiments may be applied to an application environment shown in FIG. 1. A terminal 102 communicates with a server 104 by using a network. A data storage system may store data that the server 104 is to process. The data storage system may be integrated on the server 104, or may be placed on the cloud or another server.

Target interaction text may be current interaction text of a target object for a target media object. The current interaction text is text triggered by the target object for the target media object at a current time. The terminal 102 receives the current interaction text inputted by the target object for the target media object at the current time, determines the current interaction text as the target interaction text into which an emoji image is to be inserted, and transmits the target interaction text to the server 104. The server 104 may predict a target emoji type matching the target interaction text according to the target interaction text and a plurality of pieces of historical interaction content of the target object that include emoji images; perform feature extraction on the target interaction text to obtain a target text feature, and perform feature extraction on at least one reference emoji image to obtain a reference image feature; and perform encoding based on the target text feature and the reference image feature, and decode a result obtained by the encoding, to generate a target emoji image matching the target interaction text. The server 104 may return the target emoji image to the terminal 102. The terminal 102 may automatically insert the target emoji image into the target interaction text to generate target interaction content of the target object for the target media object. The terminal 102 may display the target emoji image, and may insert, in response to an emoji insertion operation on the target emoji image, the target emoji image into the target interaction text to generate target interaction content of the target object for the target media object. The emoji insertion operation is an operation configured for triggering the insertion of the target emoji image into the target interaction text, and includes but is not limited to a tap operation on the target emoji image, a trigger operation on an emoji filling control, and the like. An emoji type of the reference emoji image is the target emoji type.

In some embodiments, target interaction text is historical interaction text of a target object for a target media object. The historical interaction text of the target object for the target media object is text triggered by the target object for the target media object at a historical time. The historical interaction text may be stored in the server 104 or another device. The server 104 obtains target interaction text of a target object for a target media object; predict a target emoji type matching the target interaction text according to the target interaction text and a plurality of pieces of historical interaction content of the target object that include emoji images; perform feature extraction on the target interaction text to obtain a target text feature, and perform feature extraction on at least one reference emoji image to obtain a reference image feature; and perform encoding based on the target text feature and the reference image feature, and decode a result obtained by the encoding, to generate a target emoji image matching the target interaction text. The server 104 may store the target emoji image in association with the target interaction text. The server 104 may insert the target emoji image into the target interaction text to generate target interaction content of the target object for the target media object, and store the target interaction content. The server 104 transmits the stored target interaction content to the terminal 102 in response to an interaction content obtaining request for the target media object transmitted by the terminal 102. The terminal 102 may display the target interaction content while displaying the target media object. An emoji type of the reference emoji image is the target emoji type.

The terminal 102 may be, but is not limited to, various desktop computers, notebook computers, smartphones, tablet computers, internet of Things devices, and portable wearable devices. The Internet of Things devices may be smart speakers, smart televisions, smart air conditioners, smart in-vehicle devices, or the like. The portable wearable device may be a smart watch, a smart bracelet, a head-mounted device, or the like. The server 104 may be implemented by using an independent server or a server cluster including a plurality of servers, or may be a cloud server. The cloud server is configured to provide cloud computing services such as a cloud service, a cloud database, cloud computing, a cloud function, cloud storage, a network service, cloud communication, a middleware service, a domain name service, a security service, a Content Delivery Network (CDN), big data, and an artificial intelligence platform. The terminal and the server may be directly or indirectly connected in a wired or wireless communication manner.

The content generation method according to some embodiments may be based on artificial intelligence. For example, the target emoji type and the target emoji image in the content generation method according to some embodiments may be determined based on an artificial intelligence neural network.

The solutions provided in some embodiments relate to technologies such as artificial intelligence image processing and machine learning. The solutions are described by using the following embodiments.

Figure 2:
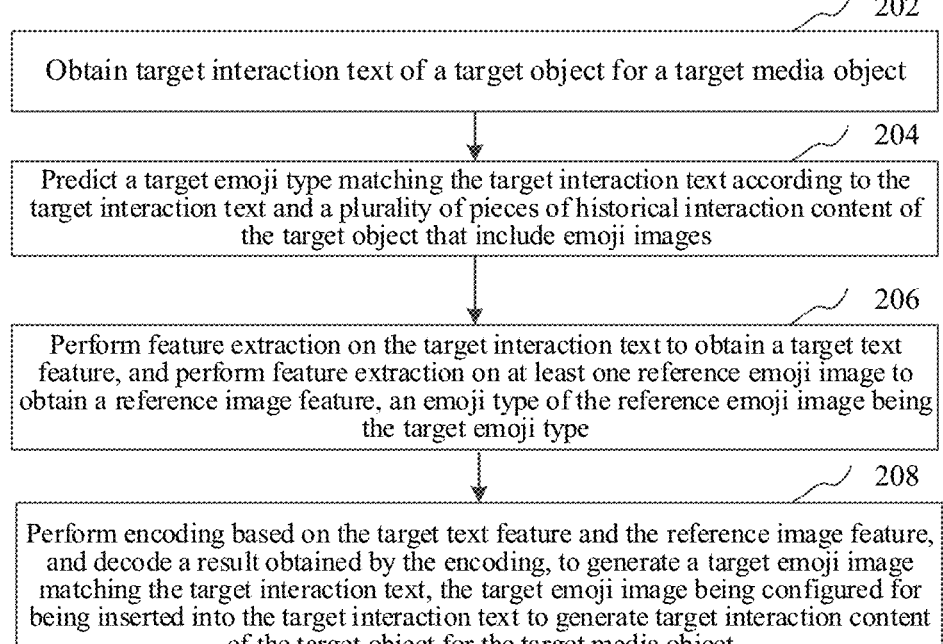
FIG. 2 is a schematic flowchart of a content generation method in some embodiments.

In some embodiments, as shown in FIG. 2, a content generation method is provided. The method may be performed by a terminal or a server, or may be jointly performed by the terminal and the server. Descriptions are provided by using an example in which the method is applied to the server 104 in FIG. 1. The method includes the following operations:

Operation 202. Obtain target interaction text of a target object for a target media object.

The media object may be content on a media platform, for example, may be at least one of an article, a picture, a video, or a live streaming on the media platform. The video includes but is not limited to at least one of a long video, a medium video, or a short video. The media platform provides a function of displaying a media object. For example, the media platform may be a video application, a short video application, a live streaming application, or a news application. The media platform may further provide a function of creating a media object, sharing a media object, or the like. A media object may be created through the media platform and the created media object is shared on the media platform. For example, a video may be shared on the media platform, so that the video becomes a media object on the media platform. The media object may be content in a web page, for example, may be at least one of an article, a picture, a video, or a live streaming in the web page, and may be, for example, content posted in a post bar. The target media object may be any media object, for example, a video, a live streaming, a picture, an article, or the like.

The target object is an object that can interact with the target media object. For example, when the target media object is content on a media platform, the target object may be a user on the media platform.

Interaction content may be generated during the interaction between the target object and the target media object. The interaction content is content generated by the interaction between the target object and the target media object. The interaction content may be, for example, content submitted by the target object when making a comment reply to the target media object. The interaction content may include at least one of the following: text, an image, voice, and a video. The server may have various pieces of historical interaction content of the target object for the target media object stored therein.

The target interaction text is interaction text to which an emoji is to be added, for example, interaction text into which an emoji image is to be inserted. The target interaction text can be any one of current interaction text or historical interaction content of the target object for the target media object. The current interaction text is interaction text triggered at a current time. For example, the current interaction text is interaction text inputted by the target object for the target media object and detected by the terminal at the current time. The terminal transmits the text to the server, so that the server can obtain the target interaction text. The historical interaction content is interaction content submitted at a historical time. The server may have various pieces of historical interaction content of the target object for the target media object stored therein. The historical interaction content may include at least one of the following: text, an image, voice, and a video. For example, when the target media object is a video, the target interaction content may be a comment reply made by the user in a comment area when watching the video.

The target interaction text may be current interaction text of the target object for the target media object. The terminal receives the interaction text inputted by the target object for the target media object at the current time to obtain the current interaction text, and transmits the current interaction text to the server, so that the server obtains the target interaction text into which the emoji image is to be inserted.

In some embodiments, Since the historical interaction content in the form of text (for example, the historical interaction content including only text and not including the emoji image) does not include the emoji image, richness and an emotion expression capability of the historical interaction content in the form of text are weak. Therefore, the emoji image can be inserted into the historical interaction content in the form of text to generate the target interaction content including the emoji image and corresponding to the historical interaction content in the form of text. The target interaction text may be historical interaction content in the form of text of the target object for the target media object. The server can obtain the historical interaction content in the form of text of the target object for the target media object, to obtain the target interaction text into which the emoji image is to be inserted, so that richness and an emotion expression capability of the historical interaction content can be improved.

In some embodiments, an example in which the current interaction text and the target interaction text are content including text is used for description. However, the current interaction text or the target interaction text may include at least one of the following: text, an image, voice, and a video. For example, the current interaction text or the target interaction text may include both text and an image.

Operation 204. Predict a target emoji type matching the target interaction text according to the target interaction text and at least one piece of historical interaction content of the target object that include emoji images.

The target emoji type is an emoji type that is selected from a plurality of emoji types and that matches an emotion expressed by the target interaction content. The plurality of emoji types are preset, for example, predetermined, and a plurality of emoji types refer to at least two emoji types. The emoji types include, but are not limited to, excitation, liking, surprise, distress, fear, shy, disgust, angry, or the like. The emoji type may also be referred to as an emoji category.

The server may determine, based on an emoji type to which an emoji image in historical interaction content of the target object including the emoji image belongs, the target emoji type matching the target interaction text from the plurality of emoji types. There are a plurality of pieces of historical interaction content of the target object including emoji images, and the plurality of pieces of historical interaction content refer to at least two pieces of historical interaction content. The historical comment content of the target object including the emoji image may be historical interaction content of the target object for a plurality of different media objects, may include historical interaction content for the target media object, and may further include historical interaction content for other media objects before the target media object.

In some embodiments, the server may obtain historical interaction content of the target media object. The historical interaction content of the target media object may be triggered by the target object or triggered by another user who can interact with the target media object. There may be one piece or a plurality of pieces of historical interaction content of the target media object, and the plurality of pieces of historical interaction content refer to at least two pieces of historical interaction content. For example, the server may obtain historical interaction content of the target media object within a preset period of time, or the server may obtain all historical interaction content of the target media object. The preset period of time may be set to different periods, for example, may be any one of the last week, the last month, or the last year. The historical interaction content of the target media object may include at least one of the following: text, an image, voice, and a video. For each historical interaction content of the target media object, the server may extract at least a part of the historical interaction content to obtain historical interaction text of the target media object. The historical interaction text may include at least one of the following: text, an image, voice, and a video. For example, the historical interaction content itself may be used as the historical interaction text, or a text part extracted from the historical interaction content may be used as the historical interaction text. In some embodiments, an example in which the historical interaction text includes text is used for description. The server may determine, according to the historical interaction text and the target interaction text of the target media object, the target emoji type matching the target interaction text from the plurality of emoji types.

Operation 206. Perform feature extraction on the target interaction text to obtain a target text feature, and perform feature extraction on at least one reference emoji image to obtain a reference image feature. An emoji type of the reference emoji image is the target emoji type.

The emoji type of the reference emoji image is the target emoji type. The reference emoji image may be an emoji image of an existing target emoji type or an emoji image obtained by disturbing an emoji image of the existing target emoji type. Disturbing the emoji image refers to adding noise to the emoji image. The reference emoji image is configured for generating a candidate emoji image. There may be a difference between candidate emoji images generated by using different reference emoji images. Therefore, different candidate emoji images may be generated by updating the reference emoji image until a generated candidate emoji image matches the target interaction text, and the candidate emoji image matching the target interaction text is determined as the target emoji image. When there is one reference emoji image, the server may perform feature extraction on the reference emoji image, and determine an extracted feature as a reference image feature. When there are at least two reference emoji images, for each reference emoji image, the server may perform feature extraction on the reference emoji image to obtain an image feature of the reference emoji image, and perform feature fusion on respective image features of the reference emoji images to obtain a reference image feature. When there are at least two reference emoji images, the server may first perform image fusion on the reference emoji images to obtain a reference fused image, and may extract an image feature in the reference fused image to obtain a reference image feature.

In some embodiments, when the target interaction text is current interaction text of the target object for the target media object, the server may determine a target emoji type matching the current interaction text, and generate, based on the current interaction text and the at least one reference emoji image, a target emoji image matching the current interaction text. The server returns the target emoji image to the terminal. The terminal may automatically insert the target emoji image into the current interaction text to generate target interaction content of the target object for the target media object. The terminal may display the target emoji image, and may insert, in response to an emoji insertion operation on the target emoji image, the target emoji image into the current interaction text to generate target interaction content of the target object for the target media object. The emoji insertion operation is an operation configured for triggering the insertion of the target emoji image into the target interaction text, and includes but is not limited to a tap operation on the target emoji image, a trigger operation on an emoji filling control, and the like.

Figure 3:
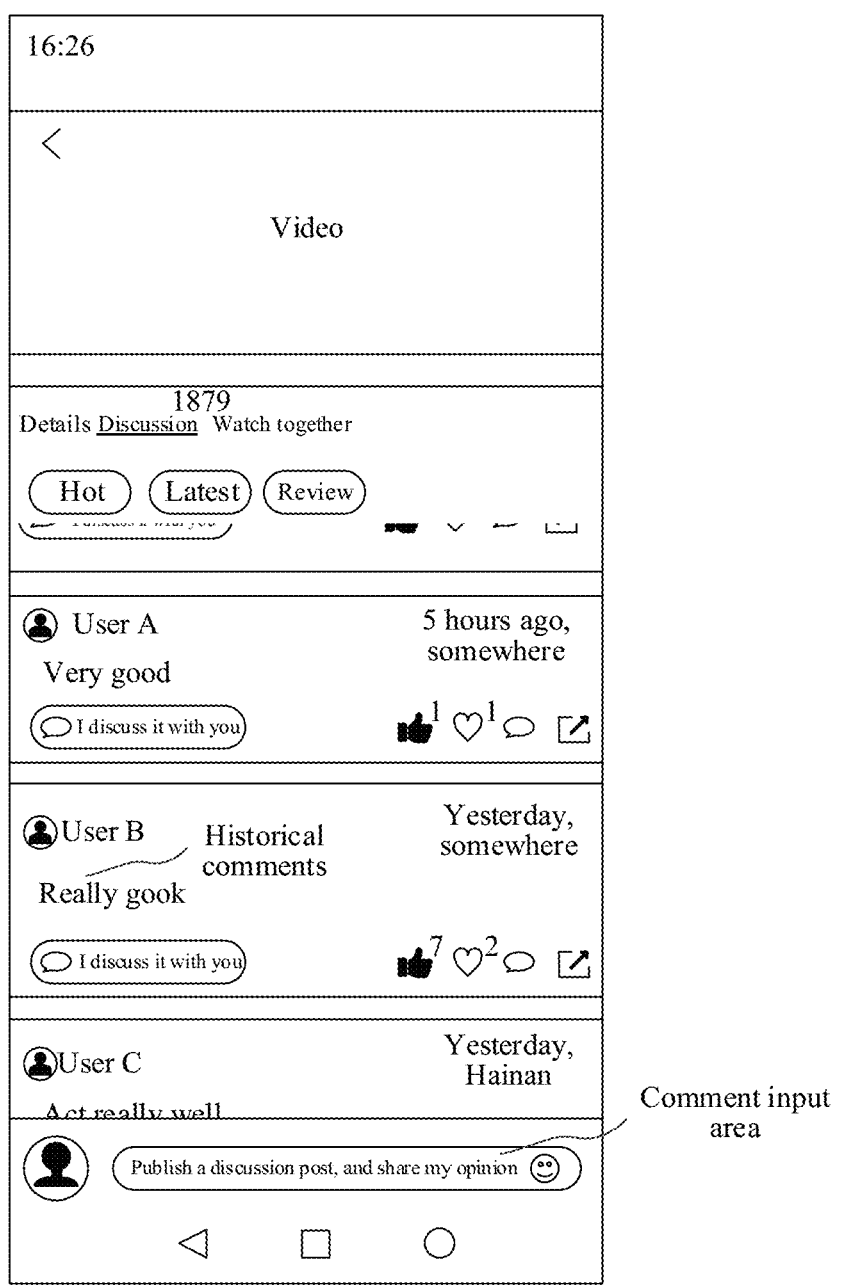
FIG. 3 is a diagram of a page displaying a video platform in some embodiments.

Using a video comment reply as an example for description, as shown in FIG. 3, a terminal displays a video on a video platform, and a comment area is displayed below the video. Historical comments and a comment input area are displayed in the comment area. The terminal obtains text inputted by a user into the comment input area to obtain current interaction text, transmits the current interaction text to a server. The server generates a target emoji image for the current interaction text, and transmits the target emoji image to the terminal. The terminal may directly insert the target emoji image into the text in the comment input area, or the terminal may display the target emoji image and insert, when receiving an emoji insertion operation, the target emoji image into the text in the comment input area.

In some embodiments, when the target interaction text is historical interaction content of the target object for the target media object, the server obtains target interaction text of the target object for the target media object, determines a target emoji type matching the target interaction text, and generates, based on the target interaction text and the at least one reference emoji image, a target emoji image matching the target interaction text. The server may perform feature extraction on the target interaction text to obtain a target text feature, and perform feature extraction on at least one reference emoji image to obtain a reference image feature; and generate, based on the target text feature and the reference image feature, a target emoji image matching the target interaction text. The server may store the target emoji image in association with the target interaction text. The server may insert the target emoji image into the target interaction text to generate target interaction content of the target object for the target media object, and may store the target interaction content. The server transmits the stored target interaction content to the terminal in response to an interaction content obtaining request for the target media object transmitted by the terminal. The terminal may display the target interaction content while displaying the target media object. The interaction content obtaining request is configured for requesting historical interaction content for the target media object.

Using a video comment reply as an example for description, as shown in FIG. 3, a terminal displays a video on a video platform, and a comment area is displayed below the video. Historical comments and a comment input area are displayed in the comment area, and there are only words and no emojis in the historical comments. For such historical comments with only words and no emojis, the server may generate a matching target emoji image for the historical comments, and insert the target emoji image into the historical comments, to generate the historical comments with the emoji image, so that the historical comments with the emoji image can be displayed when the comments of the video are displayed. Because the content generation method according to some embodiments can automatically generate an emoji image matching text according to the text, a video comment reply into which an emoji is dynamically inserted can be implemented. Since the emoji has a strong emotion expression and transfer effect, a comment effect of the user is improved by inserting the emoji into the comment reply.

Operation 208. Perform encoding based on the target text feature and the reference image feature, and decode a result obtained by the encoding, to generate a target emoji image matching the target interaction text. The target emoji image is configured for being inserted into the target interaction text to generate target interaction content of the target object for the target media object.

The server can generate the target emoji image by using a trained emoji generative model. The trained emoji generative model has input including the target interaction text and the reference emoji image, and output being a generated image. The emoji generative model may include a second encoding network and a decoding network. A feature inputted into the second encoding network includes a target text feature and a reference image feature. The server may encode the target text feature and the reference image feature through the second encoding network, and decode a result obtained by the encoding. A result of the decoding is an image. The server may use the decoded image as the target emoji image matching the target interaction text, or may calculate a probability that an emoji type to which the decoded image belongs is the target emoji type. When the probability is greater than or equal to a preset probability, the decoded image is used as the target emoji image matching the target interaction text. When the probability is less than the preset probability, the reference emoji image is updated, and an image is generated through the foregoing encoding and decoding processes again, until the probability that the emoji type to which the generated image belongs is the target emoji type is greater than or equal to the preset probability.

FIG. 4 is a flowchart of generating a comment reply in a video comment reply scenario by a content generation method according to some embodiments. The method includes:

Operation 402. Receive a current comment reply transmitted by a terminal for a video.

The video is the target media object, the current comment reply is the current interaction text, and a server can obtain the current comment reply inputted by a user when watching the video.

Operation 404. Estimate an emoji category and an emoji quantity based on the current comment reply.

The emoji category is the target emoji type. The server may calculate, based on the current comment reply, an emoji category to which an emoji that is to be inserted into the current comment reply belongs, for example, a target emoji type, and determine a quantity of emojis that is to be inserted. The quantity of emojis that is to be inserted may be referred to as a target emoji quantity.

Operation 406. Dynamically generate an emoji image based on the emoji category, a reference image, and the current comment reply.

The "reference image" refers to a reference emoji image. The server may generate an emoji image based on the emoji category, the reference image, and the current comment reply.

Operation 408. Calculate quality of the generated emoji image.

The calculating quality of the generated emoji image refers to calculating an emoji matching degree between the generated emoji image and the target emoji type. The server may regenerate an emoji image when the emoji matching degree is less than a matching degree threshold, and use the generated image as the target emoji image when the emoji matching degree is greater than or equal to the matching degree threshold. The matching degree threshold may be set based on a predetermined number. When the value of the emoji matching degree ranges from 0 to 1, the matching degree threshold is a value close to 1, for example, may be 0.98 or 0.95.

Operation 410. Calculate a position of the emoji image in the current comment reply.

The position of the emoji image in the current comment reply refers to a position at which the emoji image is inserted. The position may be referred to as an emoji insertion position.

Operation 412. Insert the emoji image into the current comment reply.

When determining the target emoji image, the server may return the target emoji image to the terminal. The terminal may display the target emoji image and insert the target emoji image into the current comment reply when receiving an operation instructing to insert the target emoji image into the current comment reply, or the terminal may automatically insert the target emoji image into the current comment reply.

In some embodiments, a solution for inserting an emoji image into a comment reply is provided. Since the inserted emoji image is generated based on an emoji category, a reference image, and a current comment reply, a matching degree between the generated emoji image and the current comment reply is improved. In addition, since the emoji image can improve an emotion expression capability, an emotion expression capability of the comment reply is improved. In some embodiments, the server may determine an emoji insertion position of the target emoji image based on the target emoji type and the target interaction text. The emoji insertion position is a position selected from positions of words in the target interaction text. the server may send the emoji insertion position and the target emoji image to the terminal. The terminal may insert the target emoji image into the target interaction text based on the emoji insertion position, to generate the target interaction content. The server may insert the target emoji image into the target interaction text based on the emoji insertion position, to generate the target interaction content. The inserting the target emoji image into the target interaction text based on the emoji insertion position may be inserting the target emoji image into a position next to the emoji insertion position.

For example, if the emoji insertion position is a position of a first word, the target emoji image is inserted between the first word and a second word. The inserting the target emoji image into the target interaction text based on the emoji insertion position may be inserting the target emoji image into a position previous to the emoji insertion position. For example, if the emoji insertion position is a position of a third word, the target emoji image is inserted between the second word and the third word.

In some embodiments, there may be a plurality of target objects that have interaction with the target media object, and the plurality of target objects refer to at least two target objects. For each target object, the content generation method according to some embodiments may be used, to add an emoji image to the target interaction text of the target object for the target media object to generate the target interaction text including the emoji image.

In the foregoing content generation method, target interaction text of a target object for a target media object is obtained; a target emoji type matching the target interaction text is predicted according to the target interaction text and a plurality of pieces of historical interaction content of the target object that include emoji images; feature extraction is performed on the target interaction text to obtain a target text feature, and feature extraction is performed on at least one reference emoji image to obtain a reference image feature; and encoding is performed based on the target text feature and the reference image feature, and a result obtained by the encoding is decoded, to generate a target emoji image matching the target interaction text. The target emoji image is configured for being inserted into the target interaction text to generate target interaction content of the target object for the target media object. Since the emoji type of the reference emoji image is the target emoji type, and the target emoji type matches the target interaction text, the target emoji image matching the target interaction text can be quickly generated based on the target interaction text and the reference emoji image, so that the target emoji image can be quickly inserted into the target interaction text to generate target interaction content, which improves content generation efficiency, improves interaction efficiency, and saves computer resources consumed in an interaction process.

Second, by performing targeted analysis and processing on the target interaction text, the generated target emoji image more accurately match the target interaction text than preset emojis in an existing emoji library, thereby generating more accurate target interaction content, to more accurately convey information that the interaction intends to express, avoiding a limitation caused by the existing emoji library, and enriching interaction content.

In addition, the existing emoji library is preset, and it is difficult to meet all interaction requirements. Therefore, an intended emoji image may not be selected through a plurality of times of selection from the existing emoji library. Therefore, a large amount of system resources may be consumed to respond to an operation during the plurality of times of selection. In some embodiments, a target emoji image matching target interaction text is automatically analyzed and generated, which reduces waste of computer resources caused by a user looking up or searching for an emoji image in a comment process, and may reduce system resource consumption for a response operation.

The content generation method according to some embodiments is applied to network media, for example, may be applied to a video comment reply scenario. In the video comment reply scenario, a video comment reply method for dynamic insertion of emojis may be implemented. An emoji category is estimated based on context content of a comment reply, an emoji consistent with the emoji type is dynamically generated for the user, and a quantity of and positions of emojis that the user may input are estimated, thereby improving diversity of emojis in the comment reply of the user, improving user convenience of a video comment function, improving quality and efficiency of the emoji comment reply of the user, and improving a comment interaction effect of a video platform, so that a video comment product contributes more power to video community interaction.

In some embodiments, the predicting a target emoji type matching the target interaction text according to the target interaction text and a plurality of pieces of historical interaction content of the target object that include emoji images includes: performing statistics on the emoji images in the plurality of pieces of historical interaction content of the target object according to emoji types, to obtain first emoji type distribution information; and predicting the target emoji type matching the target interaction text by using the first emoji type distribution information and the target interaction text.

There are a plurality of emoji types, and the emoji type distribution information is configured for representing probabilities that the emoji types occur respectively. The first emoji type distribution information is emoji type distribution information obtained by performing statistics on the emoji images in the plurality of pieces of historical interaction content of the target object that include the emoji images according to emoji types. The plurality of pieces of historical interaction content of the target object that include the emoji images may include historical interaction content of the target object for media objects other than the target media object. For example, in a video reply scenario, the historical interaction content may be comment replies of the current user in other videos, and may further include historical interaction content of the target object for the target media object.

The server may obtain a plurality of pieces of historical interaction content of the target object that include emoji images; perform statistics on a quantity of emoji images belonging to each emoji type in the plurality of pieces of historical interaction content including the emoji images, to obtain a quantity of emoji images of each emoji type, for example, perform statistics on, according to emoji types, emoji types in the plurality of pieces of historical interaction content including the emoji images, for example, perform statistics on a quantity of emoji images belonging to each emoji type, to obtain a quantity of emoji images of each emoji type, and perform statistics on a quantity of all emoji images in the plurality of pieces of historical interaction content including the emoji images, to obtain a total emoji image quantity; and determine, for each emoji type, a ratio of the quantity of emoji images of the emoji type to the total emoji image quantity as a historical occurrence probability of the emoji type, and obtain the first emoji type distribution information based on the historical occurrence probabilities respectively corresponding to the emoji types. The first emoji type distribution information includes the historical occurrence probabilities respectively corresponding to the emoji types. In some embodiments, Because the first emoji type distribution information includes the historical occurrence probabilities respectively corresponding to the emoji types, the first emoji type distribution information can represent frequencies with which the target object uses emoji images of different emoji types. Therefore, by using the first emoji type distribution information and the target interaction text, the target emoji type matching the target interaction text is predicted, thereby improving the accuracy of the target emoji type.

In some embodiments, the server may perform feature extraction on the first emoji type distribution information to obtain a type distribution feature. For each emoji type, the server may obtain a vector representation form of the emoji type to obtain an emoji feature of the emoji type. When determining the emoji feature corresponding to each emoji type, the server may perform weighted calculation on the emoji features of the emoji types by using the historical occurrence probability corresponding to each emoji type in each first emoji type distribution information, and determine a result of the weighted calculation as the type distribution feature. The server may perform feature extraction, for example, word vector transformation on the target interaction text to obtain the target text feature, and predict, based on the type distribution feature and the target text feature, the target emoji type matching the target interaction text.

In some embodiments, the server may obtain at least one piece of historical interaction text of the target media object, and predict, based on the historical interaction text, the target interaction text, and the first emoji type distribution information, the target emoji type matching the target interaction text.

In some embodiments, Because the first emoji type distribution information can represent frequencies with which the target object uses emoji images of different emoji types, the target emoji type is predicted with reference to the first emoji type distribution information, thereby improving the accuracy of the target emoji type.

In some embodiments, the predicting the target emoji type matching the target interaction text by using the first emoji type distribution information and the target interaction text includes: predicting second emoji type distribution information by using the first emoji type distribution information and the target interaction text, where the second emoji type distribution information is configured for representing a matching degree between each of the emoji types and the target interaction text; and selecting, based on the second emoji type distribution information, a target emoji type matching the target interaction text from the emoji types.

The second emoji type distribution information is configured for representing an emotion matching degree between each of the emoji types and the target interaction text. The second emoji type distribution information includes the predicted occurrence probabilities respectively corresponding to the emoji types, and the predicted occurrence probability is positively correlated with an emotion matching degree between the emoji type and the target interaction text. The emotion matching degree between the emoji type and the target interaction text may be positively correlated with the predicted occurrence probability corresponding to the emoji type. The positive correlation means that when other conditions remain unchanged, two variables change in the same direction; and when one variable changes from large to small, the other variable also changes from large to small. The positive correlation herein means that change directions are consistent, but it is not required that when one variable changes a little, the other variable changes. For example, it may be assumed that when a variable a ranges from 10 to 20, a variable b is 100, and when the variable a ranges from 20 to 30, the variable b is 120. A change direction of each of a and b may be that when a becomes larger, b also becomes larger. However, when a ranges from 10 to 20, b may be unchanged.

The server may predict, based on the type distribution feature and the target text feature, the predicted occurrence probabilities respectively corresponding to the emoji types. The second emoji type distribution information includes the predicted occurrence probabilities respectively corresponding to the emoji types. The server may determine the target emoji type matching the target interaction text from the emoji types according to the predicted occurrence probabilities respectively corresponding to the emoji types, for example, may determine an emoji type corresponding to a maximum predicted occurrence probability as the target emoji type matching the target interaction text.

Figure 5:
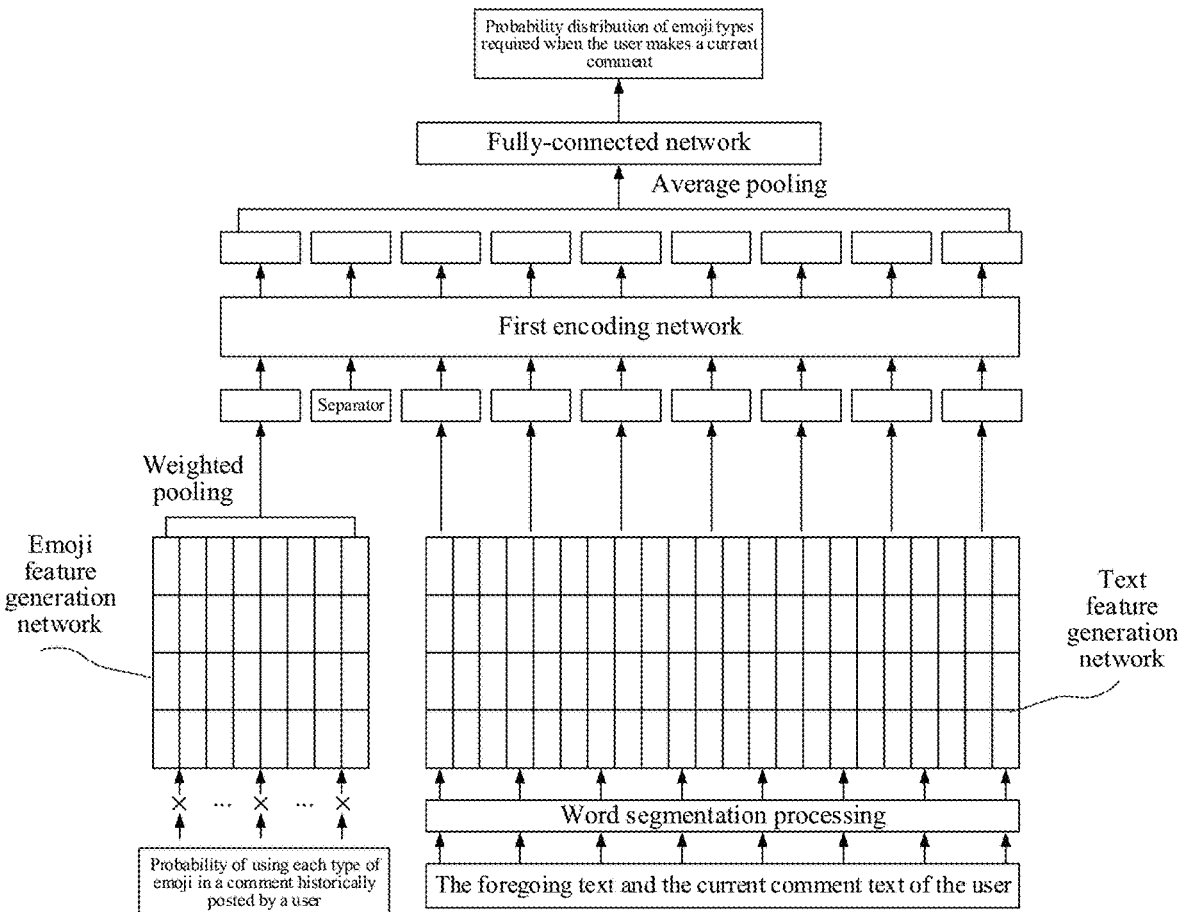
FIG. 5 is a structural diagram of an emoji type distribution prediction model in some embodiments.

In some embodiments, the server may predict the second emoji type distribution information by using an emoji type distribution prediction model. The second emoji type distribution information may also be understood as probability distribution of emoji types for the target interaction text. The emoji type distribution prediction model includes an emoji feature generation network, a text feature generation network, and a first encoding network. The emoji feature generation network is configured to generate emoji features respectively corresponding to emoji types. The text feature generation network is configured to perform word vector transformation on text to generate a text feature. The first encoding network is configured to encode an inputted feature to output a feature that can express richer information. The emoji type distribution prediction model may further include a fully-connected network and a classification output layer, and the classification output layer is configured to output the second emoji type distribution information. The fully-connected network is a fully-connected neural network. The fully-connected network may be, for example, a Position-wise Feed Forward Network (FFN). the server may input the first emoji type distribution information and the target interaction text into the emoji type distribution prediction model, determine to generate emoji features respectively corresponding to emoji types by using the emoji feature generation network, perform weighted calculation on the emoji features of the emoji types by using the historical occurrence probabilities respectively corresponding to the emoji types in the first emoji type distribution information, determine a result of the weighted calculation as a type distribution feature, perform word vector transformation on the target interaction text by using the text feature generation network to generate a target text feature, input the target text feature and the type distribution feature into the first encoding network for encoding, perform pooling, for example, average pooling on an encoding result outputted by the first encoding network, input a pooled result into the fully-connected network for processing, and input a result processed by the fully-connected network to the classification output layer, so that the classification output layer performs classification to output the second emoji type distribution information. The emoji type distribution prediction model may be a neural network model, and is trained, for example, may be trained in a video comment reply scenario through comment reply data using an emoji in a video comment reply posted by a user on a video platform. After the model converges, an emoji type may be estimated for a current comment reply or a historical comment reply including only text of the user. Parts of the emoji type distribution prediction model may be implemented by using neural networks respectively. For example, a Transformer, a BERT, or another neural network may be used as the first encoding network. The full name of BERT is "Bidirectional Encoder Representations from Transformers". The BERT is a bidirectional encoder based on a Transformer. FIG. 5 is a structural diagram of an emoji type distribution prediction model. In FIG. 5, the foregoing text in "the foregoing text and the current comment text of the user" refers to the historical interaction content, and the current comment text refers to the target interaction text. The foregoing text herein is configured for generating, when the target interaction text is the current comment text, the predicted occurrence probabilities respectively corresponding to the emoji types. The "probability of using each type of emoji in a comment historically posted by a user" refers to a historical occurrence probability corresponding to each emoji type. The "probability distribution of emoji types for when the user makes a current comment" refers to a predicted occurrence probability corresponding to each emoji type. The "weighted pooling" is configured for performing, by using the historical occurrence probabilities respectively corresponding to the emoji types in the first emoji type distribution information, weighted calculation on the emoji features of the emoji types to obtain a type distribution feature. Different types of features inputted into the first encoding network may be separated from each other by using a separator. As shown in FIG. 5, the type distribution feature and the spliced text feature are separated from each other by using a separator. The separator may be any character, for example, [SEP].

In some embodiments, the server may obtain at least one piece of historical interaction text of the target media object, and predict, based on the historical interaction text, the target interaction text, and the first emoji type distribution information, second emoji type distribution information.

In some embodiments, since the second emoji type distribution information is configured for representing a matching degree between each of the emoji types and the target interaction text, a target emoji type matching the target interaction text is selected from the emoji types based on the second emoji type distribution information, thereby improving the accuracy of the target emoji type.

In some embodiments, the predicting the target emoji type matching the target interaction text by using the first emoji type distribution information and the target interaction text includes: obtaining historical interaction text of the target media object; splicing the historical interaction text and the target interaction text to generate a spliced interaction text; and predicting the target emoji type matching the target interaction text by using the first emoji type distribution information and the spliced interaction text.

The server may obtain at least one piece of historical interaction text of the target media object; splice the historical interaction text and the target interaction text to generate a spliced interaction text; perform feature extraction, for example, word vector transformation on the spliced interaction text, to generate a spliced text feature; and predict, based on the spliced text feature and the type distribution feature, predicted occurrence probabilities respectively corresponding to the emoji types, to obtain the second emoji type distribution information, where the second emoji type distribution information includes the predicted occurrence probabilities respectively corresponding to the emoji types. Since the historical interaction text of the target media object reflects a historical opinion of the user about the target media object, the predicted occurrence probabilities respectively corresponding to the emoji types are predicted with reference to the historical interaction text of the target media object, thereby improving the accuracy of the predicted occurrence probabilities.

In some embodiments, the server may select, based on the second emoji type distribution information, a target emoji type matching the target interaction text from the emoji types. As shown in FIG. 5, the input data of the emoji type distribution prediction model includes the first emoji type distribution information, the target interaction text, and the historical interaction text of the target media object. The server may input the spliced interaction text obtained by splicing the historical interaction text and the target interaction text into the text feature generation network, perform word vector transformation by using the text feature generation network to obtain the spliced text feature, and input the spliced text feature and the type distribution feature into the first encoding network for encoding.

In some embodiments, Since the historical interaction text of the target media object reflects a historical opinion of the user about the target media object, the target emoji type is predicted with reference to the historical interaction text of the target media object, thereby improving the accuracy of the predicted target emoji type. For example, in a video comment reply scenario, the historical interaction text is, for example, the historical comment in FIG. 3, and the historical comment reflects the context information of the comment reply. Therefore, an emoji type is predicted with reference to the historical comment, and an emoji consistent with the context of the comment reply can be automatically and dynamically generated, thereby improving the richness of emojis, further increasing the richness of the user's comments, and further improving the comment interaction of the video platform.

In some embodiments, a plurality of reference emoji images are provided; and the performing feature extraction on at least one reference emoji image to obtain a reference image feature includes: performing image fusion on the reference emoji images to obtain a reference fused image; and performing image feature extraction on the reference fused image to obtain the reference image feature.

The target text feature is a feature obtained by performing feature extraction on the target interaction text. A plurality of reference emoji images are provided, and the plurality of reference emoji images refer to at least two reference emoji images.

The server may perform feature extraction on the target interaction text, for example, perform word vector transformation on words in the target interaction text, to obtain word vectors of the words, and arrange the word vectors of the words according to an order of the words in the target interaction text to obtain the target text feature.

In some embodiments, the server can perform scale transformation on reference emoji images to obtain scale-transformed reference emoji images. The sizes of the scale-transformed reference emoji images are the same, for example, the sizes are all M×N (pixels). The server can perform statistics on pixel values of pixel points at identical positions in the reference emoji images to obtain pixel value statistics results respectively corresponding to pixel points at positions. For each pixel point, the pixel value statistics result of the pixel point is used as the pixel value of the pixel point to generate a reference fused image. For each pixel point, the server may obtain pixel values of the pixel point in the reference emoji images to form a pixel value set of the pixel point, and perform statistical calculation on the pixel values in the pixel value set to obtain a pixel value statistics result of the pixel point. The statistical calculation includes but is not limited to at least one of summation calculation, weighting calculation, or mean calculation.

In some embodiments, although the emoji type of the reference emoji image is the target emoji type, degrees to which different reference emoji images conform to the target emoji type may be different. Therefore, for each reference emoji image, the server can obtain a degree to which the reference emoji image conforms to the target emoji type to obtain an emoji matching degree corresponding to the reference emoji image. When the emoji matching degrees of the reference emoji images are obtained, the server can perform weighted calculation on the pixel values in the pixel value set by using the emoji matching degrees, to obtain a pixel value statistics result of the pixel point. In the weighted calculation, a weight of a pixel value is an emoji matching degree of a reference emoji image to which the pixel value belongs.

In some embodiments, the server may perform image feature extraction on the reference fused image to obtain the reference image feature, and obtain, based on the target text feature of the target interaction text and the reference image feature, a target emoji image matching the target interaction text. The server may perform feature transformation on the reference image feature to obtain a plurality of transformed image features, where the plurality of transformed image features refer to at least two transformed image features, and obtain, based on the target text feature and the plurality of transformed image features, a target emoji image matching the target interaction text.

In some embodiments, the server may determine a target type feature of the target emoji type, and obtain, based on the target type feature, the target text feature, and the reference image feature, a target emoji image matching the target interaction text.

In some embodiments, Since the emoji type of the reference emoji image is the target emoji type, a target emoji image is generated by using a reference image feature determined from a plurality of reference emoji images and the target text feature, and the generated target emoji image can conform to the target emoji type, thereby improving the accuracy of the generated target emoji image.

In some embodiments, the performing encoding based on the target text feature and the reference image feature, and decoding a result obtained by the encoding, to generate a target emoji image matching the target interaction text includes: performing feature extraction on the target emoji type to obtain a target type feature; and performing encoding based on the target type feature, the target text feature, and the reference image feature, and decoding a result obtained by the encoding, to obtain the target emoji image matching the target interaction text.

The target type feature is a vector representation form of the target emoji type, and a vector representation form of each emoji type is different. The image generation processing may include processes of encoding and decoding.

The server may perform feature transformation on the reference image feature to obtain a plurality of transformed image features, and obtain, by using the target type feature, the target text feature, and the plurality of transformed image features, a target emoji image matching the target interaction text. For example, the server may determine an image generated by the image generation processing as a target emoji image. An image generated by the image generation processing may be determined as a candidate emoji image, and when an emoji matching degree between the target emoji type and the candidate emoji image is greater than or equal to a matching degree threshold, the candidate emoji image may be determined as the target emoji image.

In some embodiments, the server may obtain historical interaction text of the target media object; splice the historical interaction text and the target interaction text to generate a spliced interaction text; and obtain a target emoji image matching the target interaction text by using the target type feature, the spliced text feature of the spliced interaction text, and the plurality of transformed image features.

In some embodiments, the target emoji image is generated with reference to the target type feature, the target text feature, and the reference image feature, which improves accuracy of the target emoji image.

In some embodiments, the performing encoding based on the target text feature and the reference image feature, and decoding a result obtained by the encoding, to generate a target emoji image matching the target interaction text includes: performing feature transformation on the reference image feature by using a plurality of feature transformation matrices respectively, to obtain a plurality of transformed image features; and performing encoding based on the target text feature and the plurality of transformed image features, and decoding a result obtained by the encoding, to obtain the target emoji image matching the target interaction text.

The reference image feature may be in a matrix form. The feature transformation refers to a matrix product operation on the reference image feature and a feature transformation matrix. There are at least two feature transformation matrices.

For each feature transformation matrix, the server may perform matrix multiplication on the reference image feature and the feature transformation matrix to obtain a transformed image feature obtained by performing feature transformation by using the feature transformation matrix. The server may obtain a target emoji image by using the target text feature and the plurality of transformed image features. For example, the server may obtain a target emoji image matching the target interaction text by using the target type feature, the target text feature, and the plurality of transformed image features.

Figure 6:
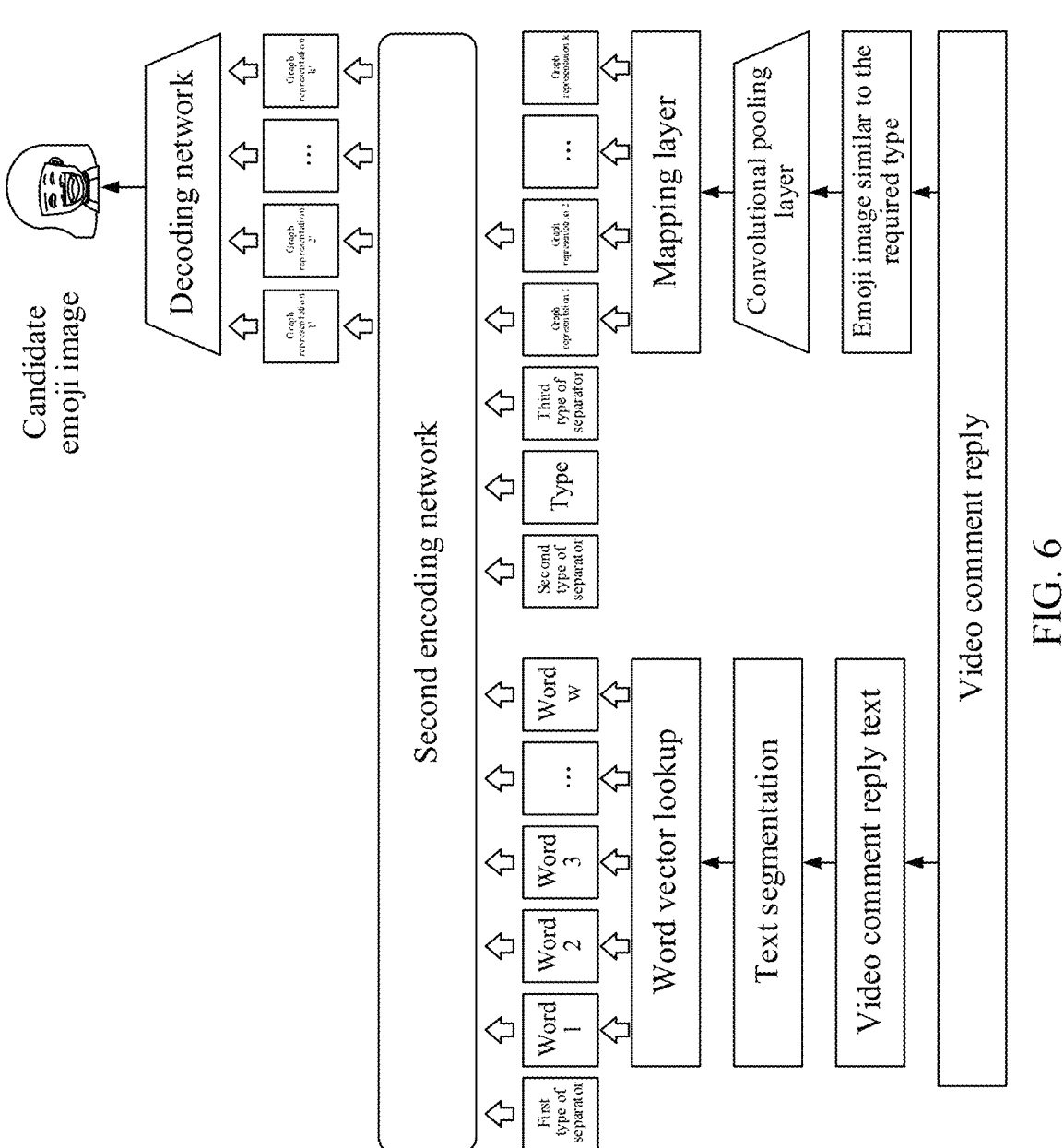
FIG. 6 is a structural diagram of a trained emoji generative model in some embodiments.

In some embodiments, the server can generate the target emoji image by using a trained emoji generative model. The trained emoji generative model has input that includes the target interaction text and the reference emoji image and may further include a target type feature of the target emoji type, and output being a generated image. The emoji generative model may include a text segmentation layer, a word vector lookup layer, a convolutional pooling layer, a mapping layer, a second encoding network, and a decoding network. FIG. 6 is a structural diagram of a trained emoji generative model in some embodiments. The text segmentation layer is configured to perform word segmentation processing on the target interaction text, the word vector lookup layer is configured to generate corresponding word vectors for words obtained through the word segmentation processing, and a target text feature is obtained from the word vectors. The "emoji image similar to the type" in FIG. 6 refers to a reference emoji image. The convolutional pooling layer is configured to perform image feature extraction on a reference fused image obtained by fusing the reference emoji images, to obtain a reference image feature. The reference emoji images may be fused by using the emoji generative model, or image fusion may be performed on the reference emoji images, and a reference fused image obtained through fusion is inputted into the emoji generative model. The mapping layer includes a plurality of feature transformation matrices, for example, the plurality of transformation matrices are parameters of the mapping layer. The mapping layer is configured to perform feature transformation on the reference image feature to obtain a plurality of transformed image features. By arranging a plurality of feature transformation matrices at the mapping layer, a quantity of parameters of the mapping layer can be enriched, and a thinking capability of the model can be improved, thereby improving accuracy of the image generated by the model. The second encoding network is configured to encode an inputted feature, and the decoding network is configured to decode a result of the encoding processing to generate an emoji image. The features inputted into the second encoding network include a target text feature and a reference image feature. The server may encode the target text feature and the reference image feature by using the second encoding network, and decode a result obtained by the encoding, to generate a target emoji image matching the target interaction text. The features inputted into the second encoding network include a target type feature of a target emoji type, a target text feature, and a reference image feature. The server may encode the target type feature of the target emoji type, the target text feature and the reference image feature by using the second encoding network, and decode a result obtained by the encoding, to generate a target emoji image matching the target interaction text. As shown in FIG. 6, in a video comment reply scenario, a word 1 to a word w are word vectors respectively corresponding to w words, a "type" inputted into the encoder refers to a target type feature, and a graph representation 1 to a graph representation k are k transformed image features. The word vectors, the target type feature, and the transformed image features are inputted into the second encoding network for encoding, to obtain an encoding result, for example, "graph representation 1' to graph representation k'". The encoding result, for example, "graph representation 1' to graph representation k'" is decoded by using the decoding network to generate a candidate emoji image. When an emoji matching degree of the candidate emoji image is greater than or equal to a matching degree threshold, the candidate emoji image is determined as the target emoji image. Otherwise, the reference emoji image is updated, and the operation of generating a candidate emoji image is repeated until a target emoji image is obtained. The features inputted into the second encoding network may be separated from each other by using a separator. For example, in FIG. 6, separation is performed by using a first type of separator, a second type of separator, and a third type of separator. The first type of separator, the second type of separator, and the third type of separator may be the same or different. For example, the first type of separator is [Txt], the second type of separator is [TP], and the third type of separator is [Img]. The second encoding network may be any neural network that can implement encoding, for example, a Transformer network.

In some embodiments, feature transformation is performed on the reference image feature by using a plurality of feature transformation matrices respectively, to obtain a plurality of transformed image features, thereby enriching features, and further improving accuracy of the target emoji image.

In some embodiments, the performing encoding based on the target text feature and the reference image feature, and decoding a result obtained by the encoding, to generate a target emoji image matching the target interaction text includes: performing encoding based on the target text feature and the reference image feature, and decoding a result obtained by the encoding, to generate a candidate emoji image; determining an emoji matching degree between the target emoji type and the candidate emoji image; updating the reference emoji image when the emoji matching degree is less than a matching degree threshold; returning to the operation of performing feature extraction on at least one reference emoji image to obtain a reference image feature, until the emoji matching degree is greater than or equal to the matching degree threshold; and determining a candidate emoji image with an emoji matching degree greater than or equal to the matching degree threshold as the target emoji image matching the target interaction text.

The method for updating the reference emoji image may be to interfere with the reference emoji image, or to select an emoji image different from the current reference emoji image from emoji images of the target emoji type as a new reference emoji image.

The emoji matching degree is configured for representing a degree to which an emoji presented by the candidate emoji image conforms to an emoji represented by the target emoji type. A larger emoji matching degree indicates that the emoji presented by the candidate emoji image may more accurately conform to the emoji represented by the target emoji type. The emoji matching degree of the candidate emoji image may be represented by a probability that the emoji type of the candidate emoji image is the target emoji type. A larger probability indicates a larger emoji matching degree. The matching degree threshold may be set based on a predetermined number. When the emoji matching degree is a probability, the matching degree threshold is a decimal close to 1, and may be, for example, 0.98 or 0.95.

Figure 7:
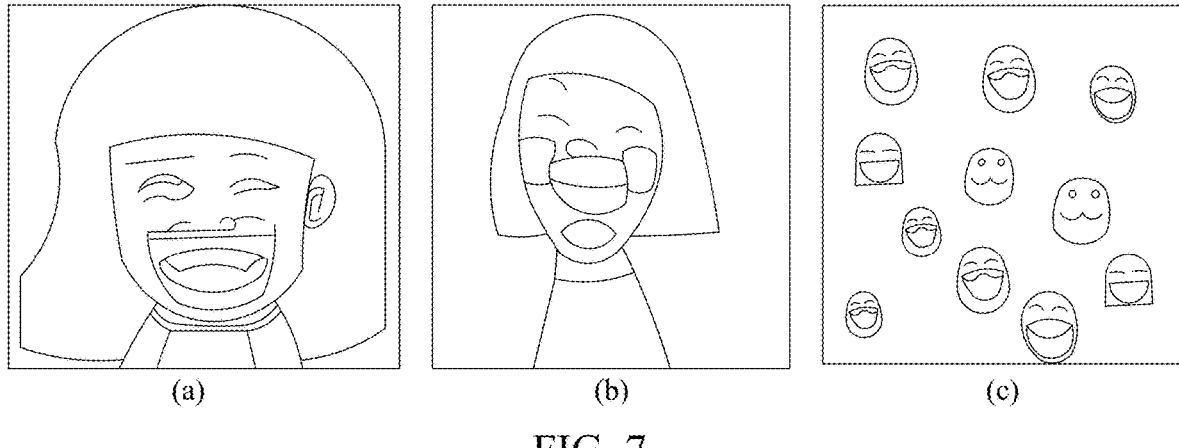
FIG. 7 is a schematic diagram of a candidate emoji image in some embodiments.

The server may generate a candidate emoji image based on the target interaction text and the reference emoji image; determine an emoji matching degree between the target emoji type and the candidate emoji image; update the reference emoji image when the emoji matching degree is less than a matching degree threshold; return to the operation of performing feature extraction on at least one reference emoji image to obtain a reference image feature, until the emoji matching degree is greater than or equal to the matching degree threshold; and determine a candidate emoji image with an emoji matching degree greater than or equal to the matching degree threshold as the target emoji image matching the target interaction text. As shown in (a), (b), and (c) in FIG. 7, three candidate emoji images generated when the target emoji type is "laughing" are displayed.

In some embodiments, the server may determine, according to the target emoji type and the candidate emoji image, an emoji matching degree between the target emoji type and the candidate emoji image. The server may determine a vector representation form of the target emoji type to obtain a target type feature, perform image feature extraction on the candidate emoji image to obtain a candidate image feature, and determine, based on the target type feature and the candidate image feature, an emoji matching degree between the target emoji type and the candidate emoji image.

Figure 8:
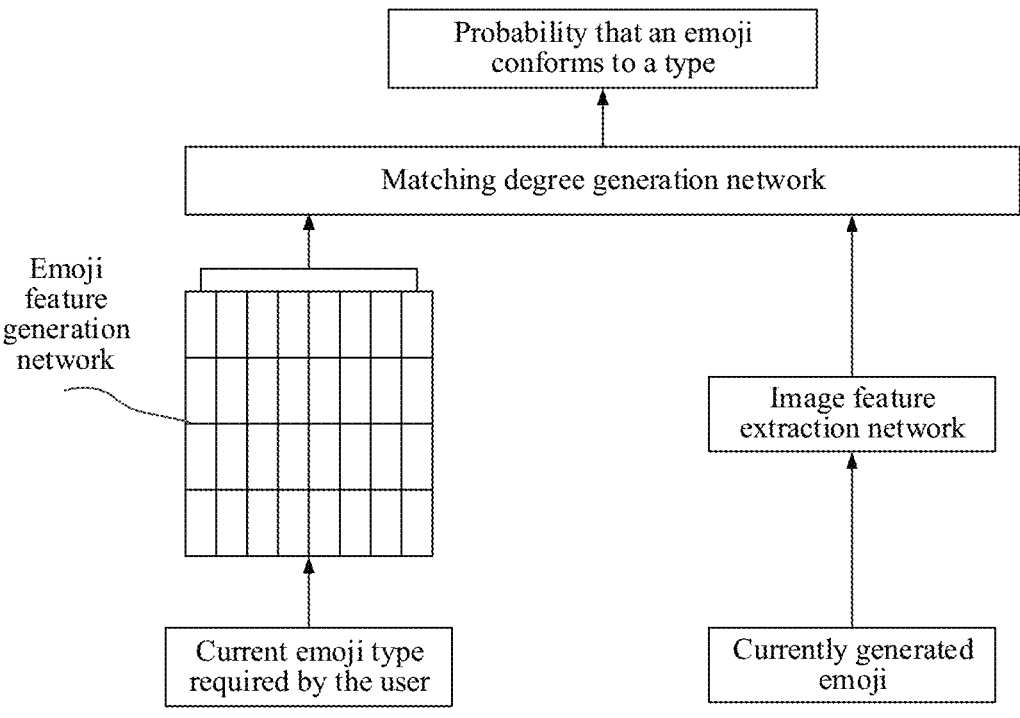
FIG. 8 is a structural diagram of a trained matching degree generative model in some embodiments.

In some embodiments, the server can determine an emoji matching degree by using a trained matching degree generative model. The matching degree generative model may include an emoji feature generation network, an image feature extraction network, and a matching degree generation network. The emoji feature generation network, the image feature extraction network, and the matching degree generation network may all be neural networks. For example, the image feature extraction network may be a ResNeXt model, and the matching degree generation network may be implemented by using a fully-connected neural network, for example, may be implemented by using an FFN. The trained matching degree generative model has input being an emoji type and an emoji image, and output being an emoji matching degree, for example, a probability that an emoji type of the inputted emoji image is the inputted emoji type. The trained matching degree generative model may be obtained by performing training on an emoji image dataset, and emoji images in the emoji image dataset are pre-annotated with emoji types to which emoji images in the emoji image dataset belong. FIG. 8 is a structural diagram of a trained matching degree generative model in some embodiments. The "current emoji type for the user" refers to a target emoji type, the "currently generated emoji" refers to a candidate emoji image, and the "probability that an emoji conforms to a type" refers to an emoji matching degree. The emoji matching degree between the reference emoji image and the target emoji type may also be determined with reference to the method in some embodiments.

In some embodiments, a candidate emoji image with an emoji matching degree greater than or equal to the matching degree threshold is determined as the target emoji image matching the target interaction text, to further improve the matching degree between the target emoji image and the target interaction text. In the video comment reply scenario, since dynamic new emojis, for example, candidate emoji images, generated based on content of the current comment reply of the user may be different from the emoji type for the user, the efficiency of generating content that conforms to the current video comment reply of the user can be further improved through the emoji matching degree.

In some embodiments, the updating the reference emoji image when the emoji matching degree is less than a matching degree threshold includes: obtaining image disturbance data when the emoji matching degree is less than the matching degree threshold; and disturbing the reference emoji image by using the image disturbance data, to update the reference emoji image.

The image disturbance data may be randomly generated, or may be generated as required. However, the disclosure is not limited thereto. The image disturbance data is configured for disturbing the reference emoji image.

The server may disturb at least one reference emoji image by using the image disturbance data to generate a disturbed emoji image, and determine the disturbed emoji image and the remaining undisturbed reference emoji images as reference emoji images of a next round, to generate new candidate emoji images in the next round.

In some embodiments, the image disturbance data may be a single value or an image. When the image disturbance data is a single value, the server may perform summation or multiplication on each pixel value in reference emoji images and the image disturbance data, to disturb the reference emoji images. When the image disturbance data is an image, the server may perform image fusion on reference emoji images and the image disturbance data, for example, perform summation or multiplication on pixel values of pixel points at identical positions, and determine a result of the image fusion as a disturbed emoji image.

In some embodiments, the reference emoji image is disturbed by using the image disturbance data, to update the reference emoji image, thereby improving the efficiency of updating the reference emoji image.

In some embodiments, the method further includes: determining an emoji insertion position of the target emoji image based on the target emoji type and the target interaction text; and inserting the target emoji image into the target interaction text based on the emoji insertion position, to generate the target interaction content of the target object for the target media object.

The server may determine a vector representation form of the target emoji type to obtain an emoji feature of the target emoji type, and The emoji feature of the target emoji type may be referred to as a target type feature. The server may determine the emoji insertion position of the target emoji image from the target interaction text by using the target text feature corresponding to the target interaction text and the target type feature.

In some embodiments, the server may perform statistics on the emoji images in the historical interaction content of the target object according to emoji types, to obtain first emoji type distribution information; and The server may determine an emoji insertion position of the target emoji image by using the first emoji type distribution information, the target emoji type, and the target interaction text.

In some embodiments, the target emoji image is inserted into the target interaction text based on the emoji insertion position determined according to the target emoji type and the target interaction text, so that the target emoji image can be inserted into an appropriate place in the target interaction text, thereby improving the properness of the position of the target emoji image in the target interaction content.

In some embodiments, the determining an emoji insertion position of the target emoji image based on the target emoji type and the target interaction text includes: performing statistics on the emoji images in the historical interaction content of the target object according to emoji types, to obtain first emoji type distribution information; predicting a target emoji quantity by using the first emoji type distribution information, the target emoji type, and the target interaction text, where the target emoji quantity is a quantity of predicted emoji images for the target interaction text; determining, based on the target emoji type and the target interaction text, emoji insertion probabilities respectively corresponding to positions in the target interaction text; and selecting a position of the target emoji quantity from the positions in descending order of the emoji insertion probabilities, to obtain each emoji insertion position.

The target emoji quantity is a quantity of predicted emoji images for the target interaction text. For example, in a video comment reply scenario, the target emoji quantity is a quantity of emojis for when the user makes a current comment. The positions in the target interaction text may be positions of words in the target interaction text. For example, the emoji insertion probability may be a probability that insertion before a word is performed or a probability that insertion after a word is performed. Using an example in which the emoji insertion probability is a probability that insertion after a word is performed, if an emoji insertion probability of a first word in the target interaction text is 0.3, a probability of inserting the target emoji image between the first word and a second word is 0.3. There may be at least one emoji insertion position. An emoji insertion probability corresponding to a position is configured for reflecting a proper degree to which the target emoji image is inserted before or after the position. A larger emoji insertion probability indicates that it is more proper to insert the target emoji image before or after the position.

The server may determine the type distribution feature by using the first emoji type distribution information, determine the target type feature corresponding to the target emoji type and the target text feature corresponding to the target interaction text, and predict the target emoji quantity based on the type distribution feature, the target type feature, and the target text feature. For example, the target emoji quantity may be predicted by using a trained emoji quantity prediction model. The emoji quantity prediction model is configured for predicting the quantity of emoji images for the interaction text. Input data of the emoji quantity prediction model includes the first emoji type distribution information, the target emoji type, and the target interaction text.

In some embodiments, the server may obtain historical interaction text of the target media object, splice the historical interaction text and the target interaction text to generate spliced interaction text, determine a spliced text feature corresponding to the spliced interaction text, and predict the target emoji quantity based on the type distribution feature, the target type feature, and the spliced text feature. For example, the target emoji quantity may be predicted by using a trained emoji quantity prediction model. The emoji quantity prediction model is configured for predicting the quantity of emoji images for the interaction text. Input data of the emoji quantity prediction model includes the first emoji type distribution information, the target emoji type, the target interaction text, and the historical interaction text of the target media object.

Figure 9:
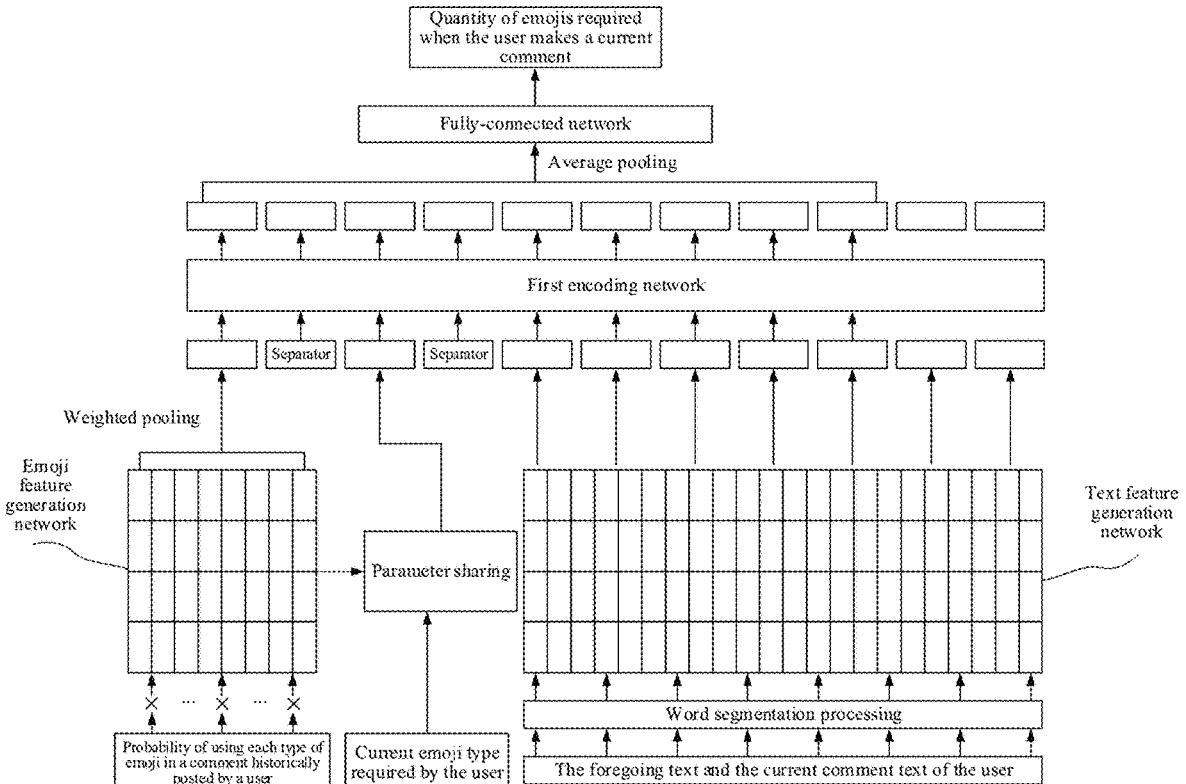
FIG. 9 is a structural diagram of a trained emoji quantity prediction model in some embodiments.

In some embodiments, the trained emoji quantity prediction model may be a model obtained by performing further training based on the trained emoji type distribution prediction model, so that the structure of the emoji quantity prediction model is the same as the structure of the emoji type distribution prediction model. FIG. 9 is a structural diagram of a trained emoji quantity prediction model. The difference is that the emoji quantity prediction model has input additionally including a target emoji type, and also has a different output result. When the emoji type distribution prediction model in FIG. 5 is trained, the emoji type distribution prediction model may be determined as a to-be-trained emoji quantity prediction model, so that the to-be-trained emoji quantity prediction model is trained until the model converges, to obtain a trained emoji quantity prediction model, and the trained emoji quantity prediction model is enabled to accurately predict the quantity of emoji images for the inputted target interaction text. In FIG. 9, the "current emoji type for the user" refers to a target emoji type, the "parameter sharing" means that the target type feature can be generated by using the emoji feature generation network, and the "quantity of emojis for when the user makes a current comment" refers to the target emoji quantity. When a quantity of emojis is calculated for the user, an emoji type for the user may be used as input simultaneously, so that the calculated quantity of emojis is more accurate.

Figure 10:
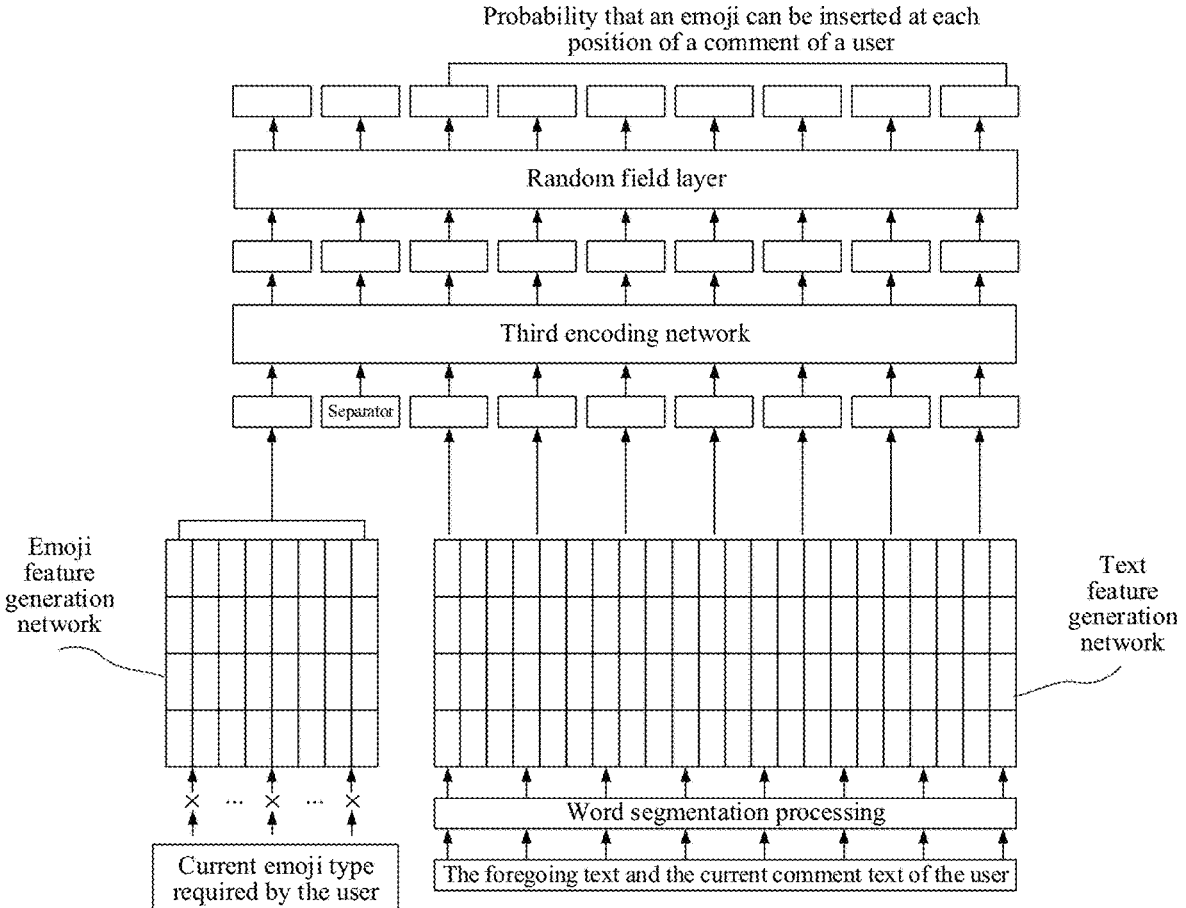
FIG. 10 is a structural diagram of an insertion position prediction model in some embodiments.

In some embodiments, the server may determine, based on the target emoji type and the target interaction text, emoji insertion probabilities respectively corresponding to positions in the target interaction text; and select a position of the target emoji quantity from the positions in descending order of the emoji insertion probabilities, to obtain each emoji insertion position. For example, the server may predict an emoji insertion probability by using a trained insertion position prediction model. Output of the insertion position prediction model is a probability that the target emoji image may be inserted corresponding to each position in the target interaction text. The input of the trained insertion position prediction model may include the target emoji type and the target interaction text. The insertion position prediction model may be a neural network model, and has a structure that may be varied. FIG. 10 is a structural diagram of an insertion position prediction model in some embodiments. It can be seen from FIG. 10 that, the insertion position prediction model includes an emoji feature generation network, a text feature generation network, a third encoding network, and a random field layer. The third encoding network may be any neural network model. For example, the third encoding network is a BERT model. The random field layer may be implemented by using any random field model, for example, may be implemented by using a conditional random field (CRF) model. A probability that the target emoji image is inserted at a corresponding position of each word in the target interaction text, for example, a probability that the target emoji image is inserted after each word may be predicted by using the model in FIG. 10. The emoji feature generation networks in FIG. 5, FIG. 8, FIG. 9, and FIG. 10 may be the same or different, and the text feature generation networks in FIG. 5, FIG. 9, and FIG. 10 may be the same or different. For example, the emoji feature generation network and the text feature generation network in FIG. 5, FIG. 9, and FIG. 10 may be obtained through training in a process of training respective models.

In some embodiments, the server may input the target emoji type and the target interaction text into the trained insertion position prediction model, generate the target type feature of the target emoji type by using the emoji feature generation network in the insertion position prediction model, and generate the target text feature of the target interaction text by using the text feature generation network in the insertion position prediction model. The target type features generated in FIG. 5, FIG. 8, FIG. 9, and FIG. 10 may be different or the same, and the target text features generated in FIG. 5, FIG. 9, and FIG. 10 may be the same or different. The server may input the target text feature and the target type feature into the third encoding network for encoding, and pass an encoding result through the random field layer to output emoji insertion probabilities respectively corresponding to positions in the target interaction text. In some embodiments, the server may determine, based on the target emoji type, the target interaction text, and the historical interaction text of the target media object, emoji insertion probabilities respectively corresponding to positions in the target interaction text. For example, the input data of the insertion position prediction model may further include historical interaction text of the target media object. The server may generate the target type feature of the target emoji type by using the emoji feature generation network in the insertion position prediction model, and generate, by using the text feature generation network in the insertion position prediction model, the spliced text feature corresponding to the spliced interaction text obtained by splicing the target interaction text and the historical interaction text. The server may input the spliced text feature and the target type feature into the third encoding network for encoding, and pass an encoding result through the random field layer to output emoji insertion probabilities respectively corresponding to positions in the target interaction text. The spliced text features generated in FIG. 5, FIG. 9, and FIG. 10 may be different or the same.

In some embodiments, when obtaining emoji insertion probabilities respectively corresponding to positions in the target interaction text, the server may select a position of the target emoji quantity from the positions in descending order of the emoji insertion probabilities, to obtain each emoji insertion position.

In some embodiments, a quantity of emojis and emoji insertion positions are automatically estimated, so that an emoji is dynamically inserted more accurately for interaction text of a user, further improving an expression effect of interaction content of the user. In a comment reply scenario, an emoji is dynamically inserted more accurately for a comment reply of a user, further improving an expression effect of a comment of the user.

In some embodiments, the target emoji image is generated by using a trained emoji generative model; and an operation of obtaining the trained emoji generative model includes: obtaining sample interaction content, where the sample interaction content includes sample interaction text and a sample emoji image; obtaining a preset emoji image belonging to a sample emoji type to obtain a sample reference image, where the sample emoji type is an emoji type of the sample emoji image; inputting the sample interaction text and the sample reference image into a to-be-trained emoji generative model to generate a predicted emoji image; and adjusting, based on an emoji matching degree between the predicted emoji image and the sample emoji type, model parameters of the to-be-trained emoji generative model, to obtain the trained emoji generative model.

The to-be-trained emoji generative model may be an untrained model or a model that is trained and further trained. A structure of the emoji generative model is shown in FIG. 6. For the method for determining an emoji matching degree between a predicted emoji image and a sample emoji type, reference may be made to the foregoing method for determining an emoji matching degree. The sample interaction content is existing interaction content including an emoji image, and may be, for example, historical interaction content. The sample interaction text is a text part of the sample interaction content, and the sample emoji image is an emoji image in the sample interaction content.

The sample emoji type is an emoji type of the sample emoji image. A preset emoji image belonging to a sample emoji type refers to an existing emoji image whose emoji type is the sample emoji type. The sample reference image may be the preset emoji image or an image obtained by disturbing the preset emoji image. There is at least one preset emoji image. For details, reference may be made to the method for determining a reference emoji image. The predicted emoji image is an emoji image generated by using the emoji generative model in a training process.

The server may determine a vector representation form of the sample emoji type to obtain a sample type feature, and input the sample type feature, the sample reference image, and the sample interaction text into the emoji generative model to generate a predicted emoji image. For a detailed process of generating the predicted emoji image, reference may be made to the process of generating a candidate emoji image. The server may generate a model loss value based on an emoji matching degree between the predicted emoji type and the sample emoji type, and the emoji matching degree between the predicted emoji type and the sample emoji type is negatively correlated with the model loss value. The negative correlation means that when other conditions remain unchanged, two variables change in opposite directions; and when one variable changes from large to small, the other variable changes from small to large. The negative correlation herein means that change directions are opposite, but it is not required that when one variable changes a little, the other variable also changes. The server may adjust parameters of the emoji generative model in a direction in which the model loss value is small, until the model converges. Model convergence includes that an emoji matching degree between the predicted emoji type and the sample emoji type is greater than a matching degree, and may further include that a change amount of the parameters of the model is less than a change amount threshold. The matching degree may be set to a predetermined number, for example, 0.99. The change amount threshold may also be set based on a predetermined number.

In some embodiments, the server may obtain an initial emoji generative model. The initial emoji generative model may be an untrained model or a model that is trained and further trained. The server may train the initial emoji generative model to obtain a to-be-trained emoji generative model. A process of training the initial emoji generative model to obtain a to-be-trained emoji generative model may be referred to as a first training stage, and a process of training the to-be-trained emoji generative model to obtain a trained emoji generative model may be referred to as a second training stage. Therefore, the trained emoji generative model can be obtained through two training stages.

In some embodiments, in the first training stage, the server may input the sample interaction text and the sample emoji image into an initial emoji generative model. The initial emoji generative model includes a convolutional pooling layer, a mapping layer, a text segmentation and mask layer, a word vector lookup layer, and a second encoding network. The sample emoji image is processed by the convolutional pooling layer and the mapping layer in the emoji generative model to obtain an image feature of the sample emoji image. Text segmentation and mask processing are performed on the sample interaction text and word vector lookup is performed, to determine a word vector of a non-mask word in the sample interaction text. A word vector of a mask word may be represented by using a preset vector. The mask word refers to a word whose word vector is invisible and may be understood as a covered word. An objective of the first training stage is to enable the model to correctly output the covered mask word. The server may input the image feature of the sample emoji images and each word vector of the sample interaction text into the second encoding network for encoding to obtain a predicted word corresponding to a mask word outputted by the model, adjust parameters of the model according to a difference between the predicted word and the mask word, until the predicted word that can be correctly outputted by the model is the same as the corresponding mask word, for example, the model converges, to obtain an emoji generative model obtained through training in the first training stage, and combine the emoji generative model obtained through training in the first training stage and a decoding network to obtain a to-be-trained emoji generative model.

Figure 11:
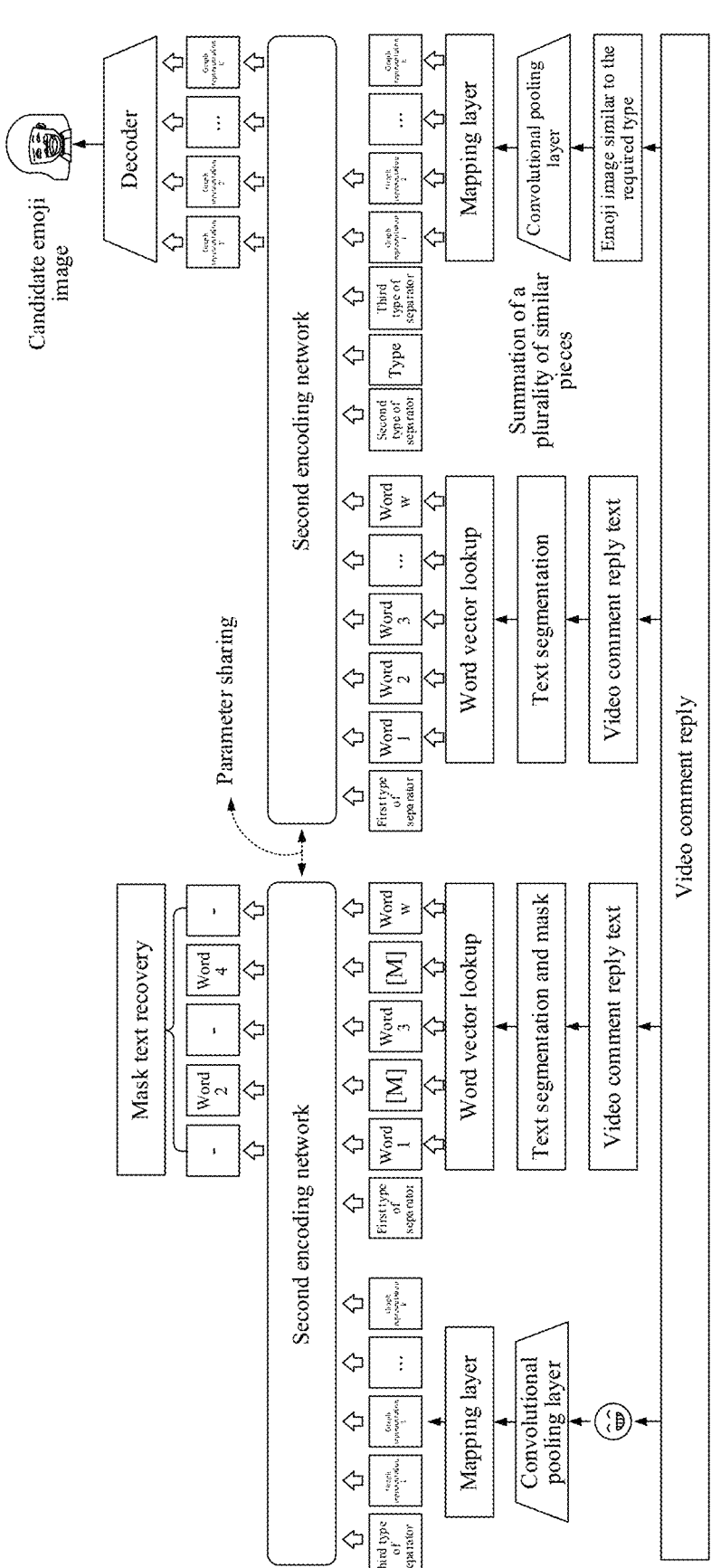
FIG. 11 is a principle diagram of training an emoji generative model in some embodiments.

For example, in FIG. 11, a left part of the figure may restore comment reply text by using an emoji image, to enhance an understanding capability of a model. Training is performed on video comment reply data with an emoji, and an objective of the training is to restore a masked part of the comment reply text. By performing training on a large number of video comment replies with emojis, the model can have a good understanding capability for both image content and text content. A right part may generate a target emoji image through comment reply text, an emoji type, and other existing reference emojis of the type.

In some embodiments, the trained emoji generative model is obtained through training by using the sample interaction content, so that the target emoji image is generated by using the trained emoji generative model, thereby improving the efficiency of generating the target emoji image.

In some embodiments, as shown in FIG. 12, a content generation method is provided. The method may be performed by a terminal or a server, or may be jointly performed by the terminal and the server. Descriptions are provided by using an example in which the method is applied to a server. The method includes the following operations:

Operation 1202. Obtain current interaction text of a target object for a target media object.

Operation 1204. Perform statistics on the emoji images in the historical interaction content of the target object according to emoji types, to obtain first emoji type distribution information.

Operation 1206. Predict second emoji type distribution information by using the first emoji type distribution information, the current interaction text, and historical interaction text of the target media object.

Operation 1208. Select, based on the second emoji type distribution information, a target emoji type matching the current interaction text from the emoji types.

Operation 1210. Obtain at least one emoji image whose emoji type is the target emoji type, to obtain reference emoji images.

Operation 1212. Perform feature extraction on the current interaction text to obtain a current text feature, perform image fusion on the reference emoji images to obtain a reference fused image based on matching degrees between the reference emoji images and the target emoji type, perform image feature extraction on the reference fused image to obtain a reference image feature, and generate a candidate emoji image based on the current text feature and the reference image feature.

Operation 1214. Determine an emoji matching degree between the target emoji type and the candidate emoji image.

Operation 1216. Determine whether the emoji matching degree is less than a matching degree threshold. If yes, operation 1218 is performed; and if no, operation 1220 is performed.

Operation 1218. Update the reference emoji images, and return to operation 1212.

Operation 1220. Determine the candidate emoji image as a target emoji image matching the current interaction text.

Operation 1222. Predict a target emoji quantity by using the first emoji type distribution information, the target emoji type, and the current interaction text.

Operation 1224. Determine, based on the target emoji type and the current interaction text, emoji insertion probabilities respectively corresponding to positions in the current interaction text.

Operation 1226. Select a position of the target emoji quantity from the positions in descending order of the emoji insertion probabilities, to obtain each emoji insertion position.

Operation 1228. Send each emoji insertion position and the target emoji image to the terminal, to cause the terminal to insert the target emoji image into the current interaction text based on the emoji insertion position, to generate current interaction content of the target object for the target media object.

In some embodiments, a candidate emoji image is generated according to the current interaction text and the reference image feature; and when an emoji matching degree between the candidate emoji image and the target emoji type is less than a matching degree threshold, the reference emoji image is updated, and a candidate emoji image is generated again, until a target emoji image matching the current interaction text is generated, thereby dynamically generating the target emoji image, increasing a matching degree between the target emoji image and the current interaction text, and improving efficiency of generating interaction content with an emoji image.

Figure 13:
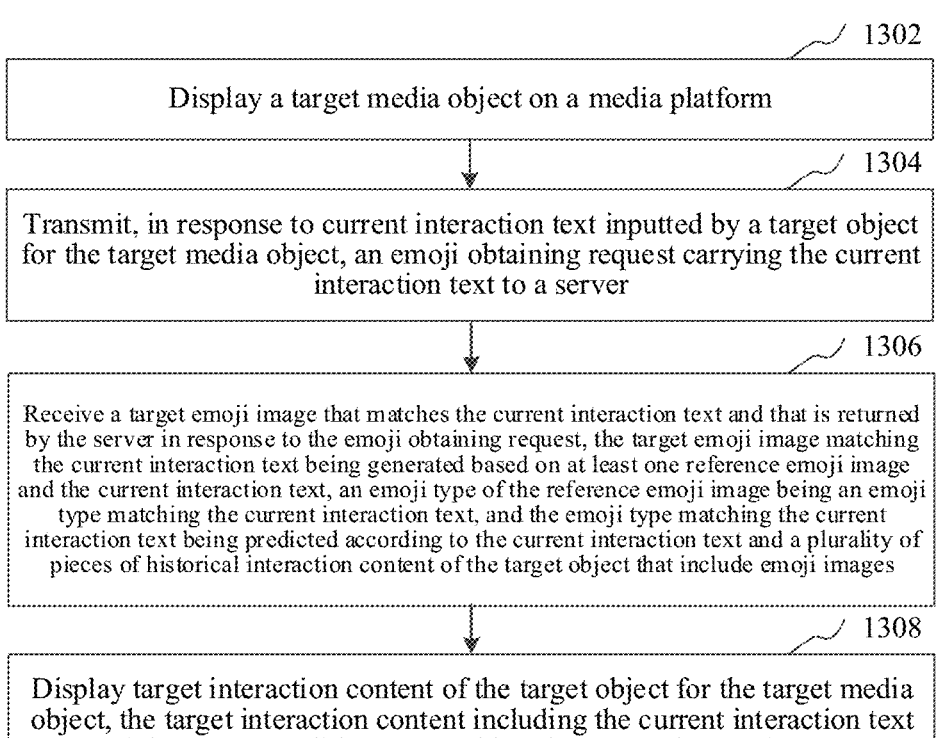
FIG. 13 is a schematic flowchart of a content generation method in some embodiments.

In some embodiments, as shown in FIG. 13, a content generation method is provided. Descriptions are provided by using an example in which the method is applied to a terminal. The method includes the following operations:

Operation 1302. Display a target media object on a media platform.

The terminal may display a page corresponding to the media platform, and display the target media object in the page.

Operation 1304. Transmit, in response to current interaction text inputted by a target object for the target media object, an emoji obtaining request carrying the current interaction text to a server.

Operation 1306. Receive a target emoji image that matches the current interaction text and that is returned by the server in response to the emoji obtaining request, the target emoji image matching the current interaction text being generated based on at least one reference emoji image and the current interaction text, an emoji type of the reference emoji image being an emoji type matching the current interaction text, and the emoji type matching the current interaction text being predicted according to the current interaction text and a plurality of pieces of historical interaction content of the target object that include emoji images.

Operation 1308. Display target interaction content of the target object for the target media object, the target interaction content including the current interaction text and the target emoji image matching the current interaction text.

Figure 14A:
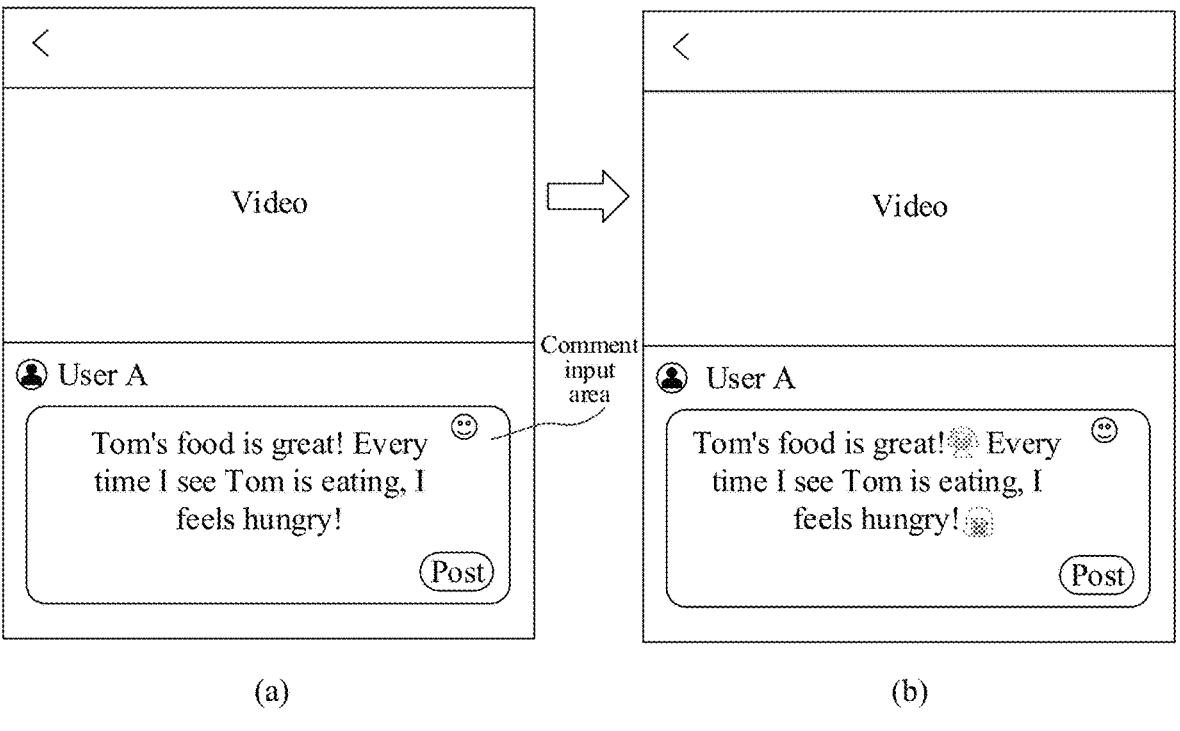
FIG. 14A is an interface diagram of a content generation method in some embodiments.

There may be at least one target emoji image, for example, two target emoji images. The terminal may transmit, in response to current interaction text inputted by a target object for the target media object, an emoji obtaining request carrying the current interaction text to a server. The server determines, in response to the emoji obtaining request, a target emoji image matching the current interaction text, and returns the target emoji image to the terminal. The terminal receives the target emoji image returned by the server, inserts the target emoji image matching the current interaction text into the current interaction text, and displays the target interaction content into which the target emoji image is inserted. As shown in FIG. 14A, inputted comment text for a video is displayed in (a) of FIG. 14A, and an emoji image matching the comment text and inserted into the comment text is displayed in (b) of FIG. 14A.

Figure 14B:
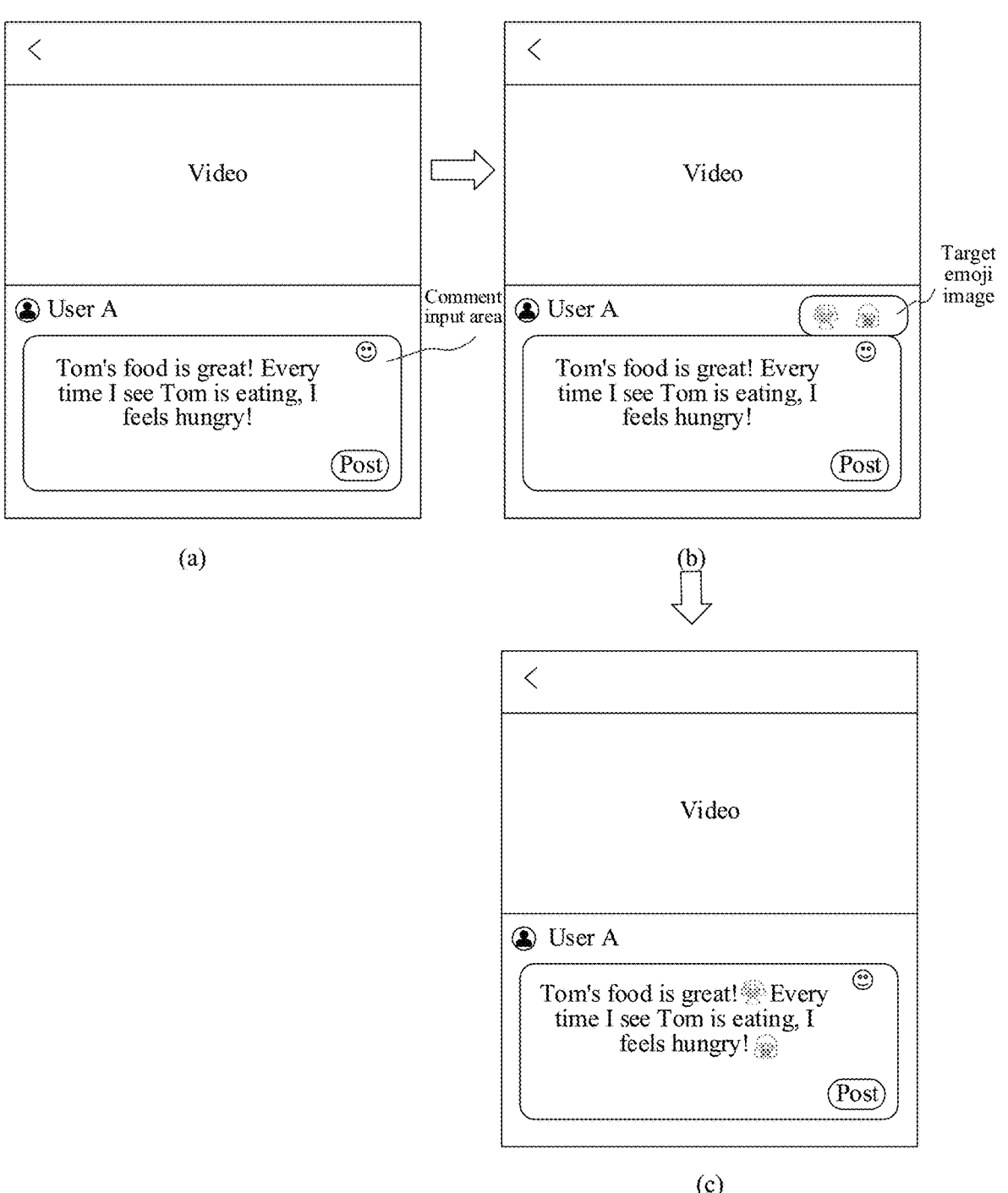
FIG. 14B is an interface diagram of a content generation method in some embodiments.

In some embodiments, the terminal receives the target emoji image returned by the server, and may display the target emoji image, insert, in response to an emoji insertion operation, the target emoji image that the emoji insertion operation instructs to insert into current interaction text to generate target interaction content, and display the target interaction content including the current interaction text and the inserted target emoji image. The emoji insertion operation may be, for example, a selection operation on the target emoji image. As shown in FIG. 14B, inputted comment text for a video is displayed in (a) of FIG. 14B, a target emoji image matching the comment text is displayed in (b) of FIG. 14B, and target interaction content generated by inserting the target emoji image that the emoji insertion operation instructs to insert into the comment text is displayed in (c) of FIG. 14B. In some embodiments, the target emoji image matching the current interaction text is displayed, which can motivate the insertion of the emoji image into the text, thereby increasing the generation of interaction content including the emoji image and improving the emotion expression capability of the interaction content.

In some embodiments, the server can select a target emoji image matching the current interaction text from a preset emoji image set. The preset emoji image set includes a plurality of preset emoji images. The server may determine a target emoji type matching the current interaction text, calculate emoji matching degrees between the preset emoji images and the target emoji type, and select a preset emoji image with an emoji matching degree greater than a matching degree threshold from the preset emoji image set to obtain a target emoji image, or select a preset emoji image with a maximum emoji matching degree from the preset emoji image set as the target emoji image.

In some embodiments, the server may further generate a target emoji image matching the current interaction text. The server may determine a target emoji type matching the current interaction text, and generate, based on the current interaction text and the reference emoji image, a target emoji image matching the target interaction text. An emoji type of the reference emoji image is the target emoji type matching the current interaction text.

In some embodiments, the media platform is a video playback platform, the target media object is a video displayed on the video playback platform, and the current interaction text is current comment text inputted by the target object for the video. The terminal displays, in response to current comment text inputted by the target object for the video displayed on the video playback platform, a target emoji image matching the current comment text, and insert, when an emoji insertion operation triggered by the target object is received, the target emoji image into the displayed current interaction text, to generate target comment content of the target object for the video.

In the foregoing content generation method, on the media platform, the target media object is displayed, and the target interaction content for the target media object is displayed in response to the current interaction text inputted for the target media object, thereby improving the content generation efficiency. In addition, since the target interaction content includes the target emoji image matching the current interaction text, an emotion expression capability of the interaction content is improved.

In some embodiments, the target emoji image is generated based on the current interaction text and the reference emoji image; and an emoji type of the reference emoji image is the target emoji type matching the current interaction text.

In some embodiments, Since the emoji type of the reference emoji image is the target emoji type matching the current interaction text, the target emoji image matching the current interaction text can be quickly generated based on the current interaction text and the reference emoji image, thereby improving the content generation efficiency. In addition, generating a target emoji image that does not exist may not be limited to selecting the target emoji image from existing emoji images, which improves flexibility and richness of obtaining the target emoji image.

The content generation method according to some embodiments may be applied to any interaction scenario, including but not limited to interaction in live streaming, interaction in a video playback application, and interaction in a news application. A social application includes an instant messaging application.

For example, in a video playback application, the video playback application may provide a comment function for a played video, and a user may use the comment function to make a comment on the played video. In this scenario, the target media object is a video, the interaction text is comment information inputted into a comment editing area, and the comment information includes at least one of the following: text, an image, voice, and a video. The terminal may display a video playback page of the video playback application, display the video and the comment editing area in the video playback page, and obtain the comment information inputted into the comment editing area. The terminal transmits the obtained comment information to a server corresponding to the video playback application. The server determines a target emoji type matching the comment information, generates, based on the comment information and the reference emoji image, a target emoji image matching the comment information, and automatically inserts the target emoji image into the comment information. The terminal may insert the target emoji image into the comment information in response to an emoji insertion operation on the target emoji image, to generate comment content of the target object for the video.

When a user makes to a video comment replay, only a few fixed emojis can be recommended. As a result, after the user uses the emojis for a plurality of times, a feeling of freshness is missing, and a quantity of emojis and emoji insertion positions cannot be estimated for the user, affecting enthusiasm of the user for posting a video comment reply, and further affecting an interaction atmosphere of the video platform. However, according to the content generation method according to some embodiments, a video comment reply method for dynamic insertion of emojis is implemented. The dynamic insertion may be reflected in automatically generating, according to text, an emoji image matching the text. By repeatedly modeling and understanding a current comment reply and context, for example, a historical comment reply of a user, an emoji type for the user is estimated, an emoji corresponding to the type is dynamically generated for the user based on a deep generative model, and with reference to accurate estimation of a quantity and positions of emojis, quality and efficiency of video comment replies of the user are improved, thereby improving the overall interaction atmosphere of the platform.

In a live streaming scenario, the terminal displays a live streaming interface in an application that provides a live streaming function and to which the target object logs in, displays live streaming content and a content editing area on the live streaming interface, and obtains interaction text inputted into the content editing area. The interaction text includes at least one of the following: text, an image, voice, and a video. The terminal transmits the obtained interaction text to a server corresponding to the instant messaging application. The server determines a target emoji type matching the interaction text, generates, based on the interaction text and the reference emoji image, a target emoji image matching the interaction text, and automatically inserts the target emoji image into the interaction text. The terminal inserts the target emoji image into the interaction text in response to an emoji insertion operation on the target emoji image, to generate interaction content of the target object for the live streaming content. Therefore, interaction efficiency in the live streaming scenario may be improved.

Although the operations are displayed sequentially according to the instructions of the arrows in the flowcharts in the embodiments, these operations are not necessarily performed sequentially according to the sequence instructed by the arrows. Unless indicated otherwise, execution of the operations is not limited, and the operations may be performed in other sequences. Moreover, at least some of the operations in the flowchart in each embodiment may include a plurality of operations or a plurality of stages. The operations or stages are not necessarily performed at the same moment but may be performed at different moments. Execution of the operations or stages is not necessarily sequentially performed, but may be performed alternately with other operations or at least some of operations or stages of other operations.

Some embodiments provide a content generation apparatus for implementing the foregoing content generation method. For implementation details, reference may be made to the descriptions of the content generation method according to some embodiments.

Figure 15:
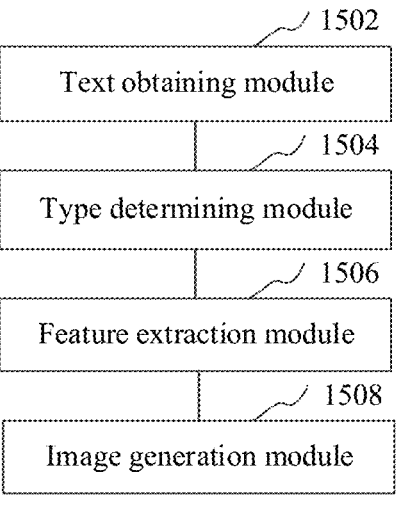
FIG. 15 is a structural block diagram of a content generation apparatus in some embodiments.

In some embodiments, as shown in FIG. 15, a content generation apparatus is provided. The apparatus includes: a text obtaining module 1502, a type determining module 1504, a feature extraction module 1506, and an image generation module 1508.

The text obtaining module 1502 is configured to obtain target interaction text of a target object for a target media object.

The type determining module 1504 is configured to predict a target emoji type matching the target interaction text according to the target interaction text and a plurality of pieces of historical interaction content of the target object that include emoji images.

The feature extraction module 1506 is configured to perform feature extraction on the target interaction text to obtain a target text feature, and perform feature extraction on at least one reference emoji image to obtain a reference image feature. An emoji type of the reference emoji image is the target emoji type.

The image generation module 1508 is configured to perform encoding based on the target text feature and the reference image feature, and decode a result obtained by the encoding, to generate a target emoji image matching the target interaction text, the target emoji image is configured for being inserted into the target interaction text to generate target interaction content of the target object for the target media object.

In some embodiments, the type determining module 1504 is further configured to: perform statistics on the emoji images in the plurality of pieces of historical interaction content of the target object according to emoji types, to obtain first emoji type distribution information; and predict the target emoji type matching the target interaction text by using the first emoji type distribution information and the target interaction text.

In some embodiments, the type determining module 1504 is further configured to: obtain the plurality of pieces of historical interaction content of the target object that include emoji images; perform statistics on a quantity of emoji images belonging to each emoji type in the plurality of pieces of historical interaction content including emoji images, to obtain the quantity of the emoji images of each emoji type; perform statistics on a quantity of all emoji images in the plurality of pieces of historical interaction content including emoji images, to obtain a total emoji image quantity; determine, for each emoji type, a ratio of a quantity of emoji images of the emoji type to the total emoji image quantity as a historical occurrence probability of the emoji type; and obtain the first emoji type distribution information based on the historical occurrence probabilities respectively corresponding to the emoji types, the first emoji type distribution information includes the historical occurrence probabilities respectively corresponding to the emoji types.

In some embodiments, the type determining module 1504 is further configured to: predict second emoji type distribution information by using the first emoji type distribution information and the target interaction text, where the second emoji type distribution information is configured for representing a matching degree between each of the emoji types and the target interaction text; and select, based on the second emoji type distribution information, a target emoji type matching the target interaction text from the emoji types.

In some embodiments, the type determining module 1504 is further configured to: obtain historical interaction text of the target media object; splice the historical interaction text and the target interaction text to generate a spliced interaction text; and perform word vector transformation on the spliced interaction text to generate a spliced text feature; obtain a type distribution feature obtained by performing feature extraction on the first emoji type distribution information; and predict, based on the spliced text feature and the type distribution feature, predicted occurrence probabilities respectively corresponding to the emoji types, to obtain the second emoji type distribution information, where the second emoji type distribution information includes the predicted occurrence probabilities respectively corresponding to the emoji types.

In some embodiments, the type determining module 1504 is further configured to: obtain historical interaction text of the target media object; splice the historical interaction text and the target interaction text to generate a spliced interaction text; and predict the target emoji type matching the target interaction text by using the first emoji type distribution information and the spliced interaction text.

In some embodiments, a plurality of reference emoji images are provided; and the feature extraction module 1506 is further configured to: perform image fusion on the reference emoji images to obtain a reference fused image; and perform image feature extraction on the reference fused image to obtain the reference image feature.

In some embodiments, the image generation module 1508 is further configured to: perform feature extraction on the target emoji type to obtain a target type feature; and perform encoding based on the target type feature, the target text feature, and the reference image feature, and decode a result obtained by the encoding, to obtain the target emoji image matching the target interaction text.

In some embodiments, the image generation module 1508 is further configured to: perform feature transformation on the reference image feature by using a plurality of feature transformation matrices respectively, to obtain a plurality of transformed image features; and perform encoding based on the target text feature and the plurality of transformed image features, and decode a result obtained by the encoding, to obtain the target emoji image matching the target interaction text.

In some embodiments, the image generation module 1508 is further configured to: perform encoding based on the target text feature and the reference image feature, and decode a result obtained by the encoding, to generate a candidate emoji image; determine an emoji matching degree between the target emoji type and the candidate emoji image; update the reference emoji image when the emoji matching degree is less than a matching degree threshold; return to the operation of performing feature extraction on at least one reference emoji image to obtain a reference image feature, until the emoji matching degree is greater than or equal to the matching degree threshold; and determine a candidate emoji image with an emoji matching degree greater than or equal to the matching degree threshold as the target emoji image matching the target interaction text.

In some embodiments, the image generation module 1508 is further configured to: obtain image disturbance data when the emoji matching degree is less than the matching degree threshold; and disturb the reference emoji image by using the image disturbance data, to update the reference emoji image.

In some embodiments, the apparatus further includes a content generation module. the content generation module is further configured to: determine an emoji insertion position of the target emoji image based on the target emoji type and the target interaction text; and insert the target emoji image into the target interaction text based on the emoji insertion position, to generate the target interaction content of the target object for the target media object.

In some embodiments, the content generation module is further configured to: perform statistics on the emoji images in the historical interaction content of the target object according to emoji types, to obtain first emoji type distribution information; predict a target emoji quantity by using the first emoji type distribution information, the target emoji type, and the target interaction text, where the target emoji quantity is a quantity of predicted emoji images for the target interaction text; determine, based on the target emoji type and the target interaction text, emoji insertion probabilities respectively corresponding to positions in the target interaction text; and select a position of the target emoji quantity from the positions in descending order of the emoji insertion probabilities, to obtain each emoji insertion position.

In some embodiments, the target emoji image is generated by using a trained emoji generative model; and the apparatus further includes a model training module that obtains a trained emoji generative model. The model training module is configured to: obtain sample interaction content, where the sample interaction content includes sample interaction text and a sample emoji image; obtain a preset emoji image belonging to a sample emoji type to obtain a sample reference image, where the sample emoji type is an emoji type of the sample emoji image; input the sample interaction text and the sample reference image into a to-be-trained emoji generative model to generate a predicted emoji image; and adjust, based on an emoji matching degree between the predicted emoji image and the sample emoji type, model parameters of the to-be-trained emoji generative model, to obtain the trained emoji generative model.

Figure 16:
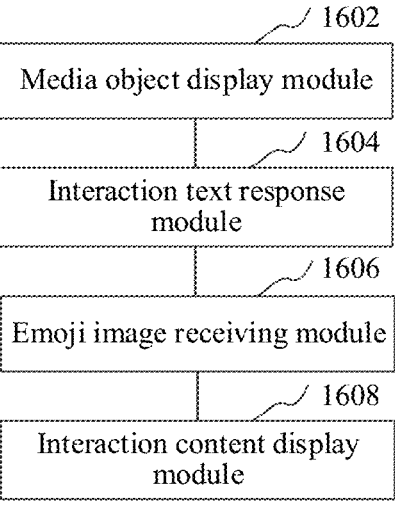
FIG. 16 is a structural block diagram of a content generation apparatus in some embodiments.

In some embodiments, as shown in FIG. 16, a content generation apparatus is provided. The apparatus includes: a media object display module 1602, an interaction text response module 1604, an emoji image receiving module 1606, and an interaction content display module 1608.

The media object display module 1602 is configured to display a target media object on a media platform.

The interaction text response module 1604 is configured to transmit, in response to current interaction text inputted by a target object for the target media object, an emoji obtaining request carrying the current interaction text to a server.

The emoji image receiving module 1606 is configured to receive a target emoji image that matches the current interaction text and that is returned by the server in response to the emoji obtaining request, the target emoji image matching the current interaction text being generated based on at least one reference emoji image and the current interaction text, an emoji type of the reference emoji image being an emoji type matching the current interaction text, and the emoji type matching the current interaction text being predicted according to the current interaction text and a plurality of pieces of historical interaction content of the target object that include emoji images.

The interaction content display module 1608 is configured to display target interaction content of the target object for the target media object, the target interaction content including the current interaction text and the target emoji image matching the current interaction text.

According to some embodiments, each module may exist respectively or be combined into one or more modules. Some modules may be further split into multiple smaller function subunits, thereby implementing the same operations without affecting the technical effects of some embodiments. The modules are divided based on logical functions. In actual applications, a function of one module may be realized by multiple modules, or functions of multiple modules may be realized by one module. In some embodiments, the apparatus may further include other modules. In actual applications, these functions may also be realized cooperatively by the other modules, and may be realized cooperatively by multiple modules.

A person skilled in the art would understand that these "modules" could be implemented by hardware logic, a processor or processors executing computer software code, or a combination of both. The "modules" may also be implemented in software stored in a memory of a computer or a non-transitory computer-readable medium, where the instructions of each module are executable by a processor to thereby cause the processor to perform the respective operations of the corresponding module.

In some embodiments, a computer device is provided. The computer device may be a server, and has an internal structure diagram that may be shown in FIG. 17. The computer device includes a processor, a memory, an input/output (I/O) interface, and a communication interface. The processor, the memory, and the I/O interface are connected through a system bus, and the communication interface is connected to the system bus through the I/O interface. The processor of the computer device is configured to provide computing and control capabilities. The memory of the computer device includes a non-volatile storage medium and an internal memory. The non-volatile storage medium has an operating system, computer-readable instructions, and a database stored therein. The internal memory provides an environment for running of the operating system and the computer-readable instructions in the non-volatile storage medium. The database of the computer device is configured to store data involved in a content generation method. The I/O interface of the computer device is configured to exchange information between the processor and an external device. The communication interface of the computer device is configured to connect and communicate with an external terminal through a network. The computer-readable instructions, when executed by the processor, implement a content generation method.

In some embodiments, a computer device is provided. The computer device may be a terminal, and has an internal structure diagram that may be shown in FIG. 18. The computer device includes a processor, a memory, an I/O interface, a communication interface, a display unit, and an input apparatus. The processor, the memory, and the I/O interface are connected through a system bus, and the communication interface, the display unit, and the input apparatus are connected to the system bus through the I/O interface. The processor of the computer device is configured to provide computing and control capabilities. The memory of the computer device includes a non-volatile storage medium and an internal memory. The non-volatile storage medium has an operating system and computer-readable instructions stored therein. The internal memory provides an environment for running of the operating system and the computer-readable instructions in the non-volatile storage medium. The I/O interface of the computer device is configured to exchange information between the processor and an external device. The communication interface of the computer device is configured to communicate with an external terminal in a wired or wireless manner. The wireless manner may be implemented through Wi-Fi, a mobile cellular network, near field communication (NFC), or another technology. The computer-readable instructions, when executed by the processor, implement a content generation method. The display unit of the computer device is configured to form a visually visible picture, and may be a display screen, a projection apparatus, or a virtual reality imaging apparatus. The display screen may be a liquid crystal display screen or an e-ink display screen. The input apparatus of the computer device may be a touch layer covering the display screen, or may be a button, a trackball, or a touchpad disposed on a housing of the computer device, or may be an external keyboard, touchpad, a mouse or the like.

Figure 17:
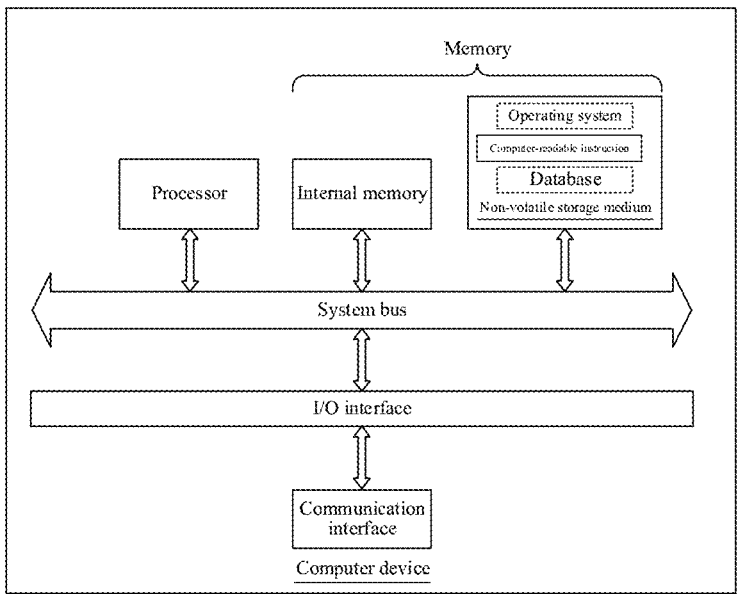
FIG. 17 is a diagram of an internal structure of a computer device in some embodiments.
Figure 18:
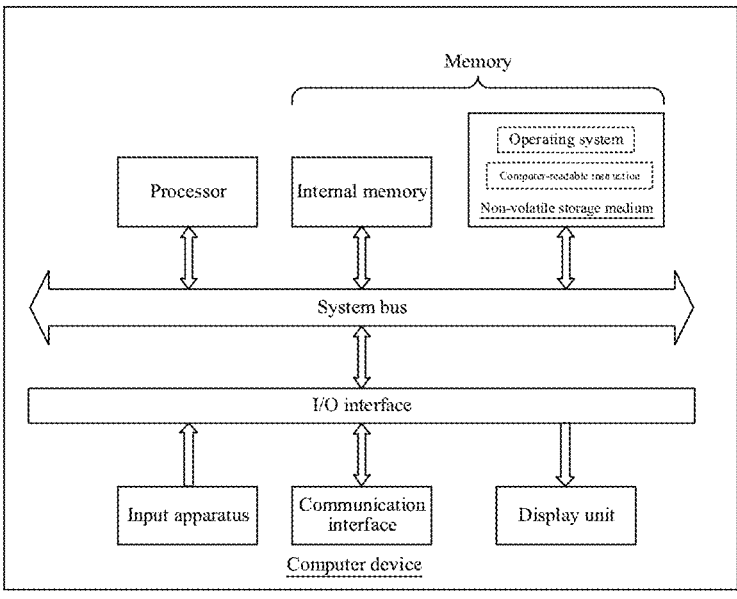
FIG. 18 is a diagram of an internal structure of a computer device in some embodiments.

A person skilled in the art may understand that, the structures shown in FIG. 17 and FIG. 18 are block diagrams of partial structures related to some embodiments, and does not constitute a limitation to the computer device. The computer device may include more components than those shown in the figure, or have some components combined, or have a different component deployment.

In some embodiments, a computer device is provided and includes a memory and one or more processors, the memory has computer-readable instructions stored therein, and the computer-readable instructions, when executed by the one or more processors, cause the one or more processors to perform the operations of the foregoing content generation method.

In some embodiments, One or more non-volatile readable storage mediums are provided and have computer-readable instructions stored therein, and the computer-readable instructions, when executed by one or more processors, cause the one or more processors to implement the operations of the foregoing content generation method.

In some embodiments, a computer program product is provided and includes computer-readable instructions, and the computer-readable instructions, when executed by a processor, implement the operations of the foregoing content generation method.

User information (including but not limited to user equipment information, user personal information, and the like) and data (including but not limited to data for analysis, stored data, displayed data, and the like) are all information and data authorized by users or fully authorized by all parties, and collection, use, and processing of relevant data should comply with relevant laws, regulations, and standards of relevant countries and regions.

A person of ordinary skill in the art may understand that all or some of the procedures of the methods in the foregoing embodiments may be implemented by a computer-readable instruction instructing relevant hardware. The computer-readable instruction may be stored in a non-volatile computer-readable storage medium. When the computer-readable instruction runs, the procedures of the foregoing method embodiments are performed. Any reference to a memory, a database, or another medium used in the various embodiments provided herein can include at least one of a non-volatile and a volatile memory. The non-volatile memory may include a Read-Only Memory (ROM), a magnetic tape, a floppy disk, a flash memory, an optical memory, a high-density embedded non-volatile memory, a resistive random access memory (ReRAM), a magnetoresistive random access memory (MRAM), a ferroelectric random access memory (FRAM), a phase change memory (PCM), a graphene memory, or the like. The volatile memory may include a random access memory (RAM) or an external cache. As an illustration rather than a limitation, the RAM is available in various forms, such as a static random access memory (SRAM) or a dynamic random access memory (DRAM). The database involved in some embodiments may include at least one of a relational database and a non-relational database. The non-relational database may include a blockchain-based distributed database, or the like, but is not limited thereto. The processor involved in some embodiments may be a central processing unit, a graphics processing unit, a digital signal processor, a programmable logic device, a quantum computing-based data processing logic device, or the like, but is not limited thereto.

The foregoing embodiments are used for describing, instead of limiting the technical solutions of the disclosure. A person of ordinary skill in the art shall understand that although the disclosure has been described in detail with reference to the foregoing embodiments, modifications can be made to the technical solutions described in the foregoing embodiments, or equivalent replacements can be made to some technical features in the technical solutions, provided that such modifications or replacements do not cause the essence of corresponding technical solutions to depart from the spirit and scope of the technical solutions of the embodiments of the disclosure and the appended claims.

What is claimed is:

1. A content generation method, performed by a computer device, comprising:

obtaining target interaction text of a target object for a target media object;

predicting a target emoji type matching the target interaction text according to the target interaction text and a plurality of pieces of historical interaction content of the target object that comprise a plurality of emoji images;

obtaining a target text feature based on performing feature extraction on the target interaction text, wherein the predicting the target emoji type and the plurality of pieces of the historical interaction content comprises:

determining first emoji type distribution information based on a distribution of a plurality of emoji types of the plurality of emoji images;

obtaining historical interaction text of the target media object;

splicing the historical interaction text and the target interaction text to generate a spliced interaction text; and predicting the target emoji type matching the target interaction text based on the first emoji type distribution information and the spliced interaction text;

obtaining a reference image feature based on performing feature extraction on at least one reference emoji image, wherein an emoji type of the at least one reference emoji image is the target emoji type;

obtaining an encoding result by performing encoding based on the target text feature and the reference image feature; and decoding the encoding result, to generate a target emoji image matching the target interaction text configured for insertion into the target interaction text to generate target interaction content of the target object for the target media object.

2. The content generation method according to claim 1, wherein the determining the first emoji type distribution information comprises:

obtaining the plurality of pieces of historical interaction content;

determining a plurality of quantities of emoji images respectively corresponding to the plurality of emoji types;

determining a total emoji image quantity of the plurality of emoji images;

determining a plurality of historical occurrence probabilities based on a plurality of ratios of the plurality of quantities of emoji images to the total emoji image quantity; and obtaining the first emoji type distribution information based on the plurality of historical occurrence probabilities, wherein the first emoji type distribution information comprises the plurality of historical occurrence probabilities.

3. The content generation method according to claim 1, wherein the predicting the target emoji type comprises:

predicting second emoji type distribution information representing a plurality of matching degrees between the plurality of emoji types and the target interaction text based on the first emoji type distribution information and the target interaction text; and selecting, based on the second emoji type distribution information, a first target emoji type matching the target interaction text from the plurality of emoji types as the target emoji type.

4. The content generation method according to claim 3, wherein the predicting the second emoji type distribution information comprises:

performing word vector transformation on the spliced interaction text to generate a spliced text feature;

obtaining a type distribution feature obtained by performing feature extraction on the first emoji type distribution information; and predicting, based on the spliced text feature and the type distribution feature, predicted occurrence probabilities respectively corresponding to the plurality of emoji types, to obtain the second emoji type distribution information, wherein the second emoji type distribution information comprises the predicted occurrence probabilities respectively corresponding to the plurality of emoji types.

5. The content generation method according to claim 1, wherein a plurality of reference emoji images are provided, and wherein the obtaining the reference image feature comprises:

performing image fusion on the plurality of reference emoji images to obtain a reference fused image; and performing image feature extraction on the reference fused image to obtain the reference image feature.

6. The content generation method according to claim 1, wherein the obtaining the encoding result comprises:

performing feature extraction on the target emoji type to obtain a target type feature; and performing encoding based on the target type feature, the target text feature, and the reference image feature.

7. The content generation method according to claim 1, wherein the obtaining the encoding result comprises:

performing feature transformation on the reference image feature based on a plurality of feature transformation matrices to obtain a plurality of transformed image features; and performing encoding based on the target text feature and the plurality of transformed image features.

8. The content generation method according to claim 1, wherein the obtaining the encoding result and the decoding the encoding result comprise:

performing encoding based on the target text feature and the reference image feature, and decoding a result obtained by the encoding, to generate a first candidate emoji image;

determining a first emoji matching degree between the target emoji type and the first candidate emoji image;

updating the at least one reference emoji image based on the first emoji matching degree being less than a matching degree threshold;

performing feature extraction on the updated at least one reference emoji image until the first emoji matching degree is greater than or equal to the matching degree threshold; and determining a second candidate emoji image with a second emoji matching degree greater than or equal to the matching degree threshold as the target emoji image matching the target interaction text.

9. A content generation apparatus, comprising:

at least one memory configured to store computer program code; and at least one processor configured to read the computer program code and operate as instructed by the computer program code, the computer program code comprising:

text obtaining code configured to cause at least one of the at least one processor to obtain target interaction text of a target object for a target media object;

type determining code configured to cause at least one of the at least one processor to predict a target emoji type matching the target interaction text according to the target interaction text and a plurality of pieces of historical interaction content of the target object that comprise a plurality of emoji images, wherein the type determining code comprises:

first determining code configured to cause at least one of the at least one processor to determine first emoji type distribution information based on a distribution of a plurality of emoji types of the plurality of emoji images, and first prediction code configured to cause at least one of the at least one processor to:

obtain historical interaction text of the target media object, splice the historical interaction text and the target interaction text to generate a spliced interaction text, and predict the target emoji type matching the target interaction text based on the first emoji type distribution information and the spliced interaction text;

feature extraction code configured to cause at least one of the at least one processor to obtain a target text feature based on performing feature extraction on the target interaction text;

referencing code configured to cause at least one of the at least one processor to obtain a reference image feature based on performing feature extraction on at least one reference emoji image, wherein an emoji type of the at least one reference emoji image is the target emoji type; and image generation code comprising encoding code and decoding code, wherein the encoding code is configured to cause at least one of the at least one processor to obtain an encoding result by performing encoding based on the target text feature and the reference image feature, and wherein the decoding code is configured to cause at least one of the at least one processor to decode the encoding result, to generate a target emoji image matching the target interaction text configured for insertion into the target interaction text to generate target interaction content of the target object for the target media object, the target emoji image being a dynamically generated new emoji image that is not a preset emoji image selected from a preset emoji library.

10. The content generation apparatus according to claim 9, wherein the first determining code is configured to cause at least one of the at least one processor to:

obtain the plurality of pieces of historical interaction content;

determine a plurality of quantities of emoji images respectively corresponding to the plurality of emoji types;

determine a total emoji image quantity of the plurality of emoji images;

determine a plurality of historical occurrence probabilities based on a plurality of ratios of the plurality of quantities of emoji images to the total emoji image quantity; and obtain the first emoji type distribution information based on the plurality of historical occurrence probabilities, wherein the first emoji type distribution information comprises the plurality of historical occurrence probabilities.

11. The content generation apparatus according to claim 9, wherein the first prediction code comprises second prediction code and selection code, wherein the second prediction code is configured to cause at least one of the at least one processor to predict second emoji type distribution information representing a plurality of matching degrees between the plurality of emoji types and the target interaction text based on the first emoji type distribution information and the target interaction text; and wherein the selection code is configured to cause at least one of the at least one processor to select, based on the second emoji type distribution information, a first target emoji type matching the target interaction text from the plurality of emoji types as the target emoji type.

12. The content generation apparatus according to claim 11, wherein the second prediction code is configured to cause at least one of the at least one processor to:

perform word vector transformation on the spliced interaction text to generate a spliced text feature;

obtain a type distribution feature obtained by performing feature extraction on the first emoji type distribution information; and predict, based on the spliced text feature and the type distribution feature, predicted occurrence probabilities respectively corresponding to the plurality of emoji types, to obtain the second emoji type distribution information, wherein the second emoji type distribution information comprises the predicted occurrence probabilities respectively corresponding to the plurality of emoji types.

13. The content generation apparatus according to claim 9, wherein a plurality of reference emoji images are provided, and wherein the referencing code is configured to cause at least one of the at least one processor to:

perform image fusion on the plurality of reference emoji images to obtain a reference fused image; and perform image feature extraction on the reference fused image to obtain the reference image feature.

14. The content generation apparatus according to claim 9, wherein the encoding code is configured to cause at least one of the at least one processor to:

perform feature extraction on the target emoji type to obtain a target type feature; and perform encoding based on the target type feature, the target text feature, and the reference image feature.

15. The content generation apparatus according to claim 9, wherein the encoding code is configured to cause at least one of the at least one processor to:

perform feature transformation on the reference image feature based on a plurality of feature transformation matrices to obtain a plurality of transformed image features; and perform encoding based on the target text feature and the plurality of transformed image features.

16. A non-transitory computer-readable storage medium, storing computer code which, when executed by at least one processor, causes the at least one processor to at least:

obtain target interaction text of a target object for a target media object;

predict a target emoji type matching the target interaction text according to the target interaction text and a plurality of pieces of historical interaction content of the target object that comprise a plurality of emoji images, wherein predicting the target emoji type and the plurality of pieces of the historical interaction content comprises:

determining first emoji type distribution information based on a distribution of a plurality of emoji types of the plurality of emoji images, obtaining historical interaction text of the target media object, splicing the historical interaction text and the target interaction text to generate a spliced interaction text, and predicting the target emoji type matching the target interaction text based on the first emoji type distribution information and the spliced interaction text;

obtain a target text feature based on performing feature extraction on the target interaction text;

obtain a reference image feature based on performing feature extraction on at least one reference emoji image, wherein an emoji type of the at least one reference emoji image is the target emoji type;

obtain an encoding result by performing encoding based on the target text feature and the reference image feature; and decode the encoding result, to generate a target emoji image matching the target interaction text configured for insertion into the target interaction text to generate target interaction content of the target object for the target media object, the target emoji image being a dynamically generated new emoji image that is not a preset emoji image selected from a preset emoji library.

* * * * *